US012172331B2

(12) United States Patent
Zografos et al.

(10) Patent No.: US 12,172,331 B2
(45) Date of Patent: Dec. 24, 2024

(54) RAZOR CARTRIDGE

(71) Applicant: BIC VIOLEX S.A., Anoixi (GR)

(72) Inventors: Georgios Zografos, Anoixi (GR); Ioanna Preza, Anoixi (GR); Ioannis Bozikis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 371 days.

(21) Appl. No.: 17/596,168

(22) PCT Filed: Jul. 30, 2020

(86) PCT No.: PCT/EP2020/071492
§ 371 (c)(1),
(2) Date: Dec. 3, 2021

(87) PCT Pub. No.: WO2021/019008
PCT Pub. Date: Feb. 4, 2021

(65) Prior Publication Data

US 2022/0234228 A1 Jul. 28, 2022

(30) Foreign Application Priority Data

Jul. 31, 2019 (EP) .................................... 19189470

(51) Int. Cl.
*B26B 21/40* (2006.01)
*A45D 27/29* (2006.01)
(Continued)

(52) U.S. Cl.
CPC .......... *B26B 21/4031* (2013.01); *A45D 27/29* (2013.01); *B26B 21/4068* (2013.01);
(Continued)

(58) Field of Classification Search
None
See application file for complete search history.

(56) References Cited

U.S. PATENT DOCUMENTS 5,341,571 A 8/1994 Prochaska
5,551,155 A 9/1996 Prochaska
(Continued)

FOREIGN PATENT DOCUMENTS

AU 724961 B2 10/2000
CN 1331623 A 1/2002
(Continued)

OTHER PUBLICATIONS

First Office Action issued in corresponding Chinese Application No. 2020800412109, mailed on May 6, 2023.
(Continued)

*Primary Examiner* — Hwei-Siu C Payer
(74) *Attorney, Agent, or Firm* — Bookoff McAndrews, PLLC

(57) ABSTRACT

A razor cartridge comprising a housing extending longitudinally along a longitudinal axis, wherein the housing comprises a leading longitudinal side, a trailing longitudinal side, and a cutting member mounting portion in-between the leading and trailing longitudinal sides for accommodating a plurality of cutting members; and a plurality of cutting members disposed at least partially in the cutting member mounting portion, wherein each cutting member is arranged between a leading longitudinal side and a trailing longitudinal side of the razor cartridge in a shaving direction of the razor cartridge, wherein one or more of the cutting members comprises a blade support having a blade mounting portion, and a blade attached to the blade mounting portion.

15 Claims, 11 Drawing Sheets

(51) Int. Cl.

| | |
|---|---|
| ***B26B 21/56*** | (2006.01) |
| *B26B 21/06* | (2006.01) |
| *B26B 21/22* | (2006.01) |

(52) U.S. Cl.
CPC ............ *B26B 21/565* (2013.01); *B26B 21/06* (2013.01); *B26B 21/225* (2013.01)

(56) References Cited

U.S. PATENT DOCUMENTS

| | | | | |
|---|---|---|---|---|
| 6,243,951 | B1 | 6/2001 | Oldroyd | |
| 10,836,059 | B2 * | 11/2020 | Efthimiadis | B26B 21/4031 |
| 2004/0168322 | A1 | 9/2004 | Richard | |
| 2006/0277759 | A1 | 12/2006 | Follo | |
| 2008/0201957 | A1 * | 8/2008 | Apprille | B26B 21/24 30/124 |
| 2009/0083982 | A1 * | 4/2009 | Forsdike | B26B 21/225 30/34.2 |
| 2010/0218381 | A1 | 9/2010 | Follo | |
| 2014/0026424 | A1 * | 1/2014 | Oglesby | B26B 21/4031 30/50 |
| 2022/0234228 | A1 * | 7/2022 | Zografos | A45D 27/29 |

FOREIGN PATENT DOCUMENTS

| | | | |
|---|---|---|---|
| CN | 103619548 | A | 3/2014 |
| CN | 107107358 | A | 8/2017 |
| JP | 5719755 | B2 * | 5/2015 |
| WO | 2004069496 | A1 | 8/2004 |
| WO | 2006027018 | A1 | 3/2006 |

OTHER PUBLICATIONS

International Search Report and Written Opinion in International Application No. PCT/EP2020/071492, mailed Oct. 13, 2020 (9 pages).

* cited by examiner

RAZOR CARTRIDGE

This application is a National Stage application of International Application No. PCT/EP2020/071492, filed on 30 Jul. 2020, now published as WO2021019008 and which claims benefit from European patent application EP19189470.8, filed on 31 Jul. 2019, the entire contents being incorporated herein by reference.

TECHNICAL FIELD

The embodiments described in the following disclosure relate to a razor cartridge, a method for manufacturing a razor cartridge, a shaving razor assembly and an associated kit of parts.

BACKGROUND

Razor cartridges (also known as safety razor cartridges) are permanently or removably attached to a razor handle that, in use, is oriented in shaving direction. Razor cartridges typically comprise one or more cutting members, each supporting a blade, mounted perpendicular to the shaving direction. Razor cartridges are also typically provided with a guard (at a leading longitudinal side of the razor cartridge in the shaving direction) and a cap (at a trailing longitudinal side of the razor cartridge in the shaving direction). In use, a user holds the razor handle in the shaving direction and brings the razor cartridge into contact with a portion of skin defining a cutting edge plane.

Typically, the cutting edge plane is defined as the plane intersecting the first and second skin contact areas of, for example, cutting edges of the shaving head. Movement of the razor handle by the user during shaving operation causes the blades of the razor cartridge to be moved across the cutting edge plane in the shaving direction, enabling the blades to remove unwanted hair.

The performance of razor cartridges may be further improved.

SUMMARY

According to a first aspect, there is provided a razor cartridge comprising a housing extending longitudinally along a longitudinal axis, wherein the housing comprises a leading longitudinal side, a trailing longitudinal side, and a cutting member mounting portion in-between the leading and trailing longitudinal sides for accommodating a plurality of cutting members; and a plurality of cutting members disposed at least partially in the cutting member mounting portion. Each cutting member is arranged between the leading longitudinal side and the trailing longitudinal side of the razor cartridge in a shaving direction of the razor cartridge.

One or more of the cutting members comprises a blade support having a blade mounting portion, and a blade attached to the blade mounting portion.

The cutting members comprised in the plurality of cutting members are configured such that, in use, a total number of skin contact areas of the cutting members with a user along a transverse cutting member contact axis is at least one greater than a total number of cutting members comprised within the plurality of cutting members. In aspects, a total number of skin contact areas of the cutting members with a user along a transverse cutting member contact axis is at least one fewer than two times the total number of cutting members of the plurality of cutting members.

According to a second aspect, there is provided a method of manufacturing a razor cartridge comprising:

- obtaining a housing extending longitudinally along a longitudinal axis, wherein the housing comprises a leading longitudinal side, a trailing longitudinal side, and a cutting member mounting portion in-between the leading and trailing longitudinal sides for accommodating a plurality of cutting members, and
- disposing a plurality of cutting members at least partially in the cutting member mounting portion to thus provide a plurality of cutting members. Each cutting member is arranged between a leading longitudinal side and a trailing longitudinal side of the razor cartridge in a shaving direction of the razor cartridge. One or more cutting members comprises a blade support having a blade mounting portion and a blade attached to the blade mounting portion.

The cutting members are configured such that, in use, a total number of skin contact areas of the cutting members with a user along a transverse cutting member contact axis is at least one greater than a total number of cutting members comprised within the plurality of cutting members. In aspects, the total number of skin contact areas of the cutting members with a user along a transverse cutting member contact axis is at least one fewer than two times the total number of cutting members.

According to a third aspect, there is provided a shaving razor assembly. The shaving razor assembly comprises a razor and a razor cartridge according to the first aspect or one of its embodiments. The razor cartridge is either releasably attached to the razor handle via a pivotable or non-pivotable connection, integrally formed with the razor handle via a non-pivotable connection, or integrally formed with the razor handle via a pivotable connection.

According to a fourth aspect, there is provided a kit of parts comprising a razor handle and a razor cartridge holder comprising a plurality of razor cartridges according to the first aspect or one of its embodiments.

An effect of a razor cartridge according to the first aspect is that the phenomenon of skin bulge between cutting members attached to a blade mounting portion is reduced, because there are more points of contact for the same number of blades (compared to a prior-art cartridge with the same number of blades).

At least one cutting member is configured so that it has two contact areas with the cutting edge plane, namely the cutting edge of a blade mounted on a support member, and a distal portion of the support member on which the blade is mounted on. A conventional cutting member has one skin contact area per cutting member (the cutting edge of a blade provided on the conventional cutting member).

The extra skin contact area provided by a blade support when the first blade is mounted closer to the leading longitudinal side of the razor cartridge equalises the distribution of the drag forces exerted by the skin against the razor cartridge, and thus mitigates irritation, nicks, and cuts during shaving.

Further, the bulging of skin between the cutting edges of the blades is reduced because an additional skin contact area provided by the blade support of at least one cutting member of the razor cartridge according to the first aspect reduces the inter-blade space between consecutive cutting members (in other words, the span between blade edges of the cutting members). The provision of additional skin contact points provides for intermediate contact points in-between the inter-blade spans of the plurality of cutting members (i.e. the cutting edges of consecutive blades).

A further effect is that a second type of cutting member can be mounted closer towards the trailing edge of the razor cartridge on top of its support member. Therefore, the second type of cutting member having one skin contact area with the cutting edge plane. The contact point of the second type of cutting member with the cutting edge plane is the blade edge of the blade mounted on the second type of cutting member. Therefore, the second type of cutting member can provide a more aggressive cutting action than the first type of cutting member, to ensure that hair remainders that were not removed by at least the first blade mounted closer to the leading longitudinal side are cut off subsequently by the second cutting member. This results in a closer shave, thus leading to a more effective cutting action whilst reducing the amount of irritation, nicks, and cuts experienced during shaving.

Another effect is that durability of the blades closer to the leading longitudinal side of the razor cartridge is enhanced, because due to the provision of the additional skin contact points cutting members having two skin contact areas exert less pressure on the skin thus resulting in a less aggressive shave and a lower rate of blade wear. The cutting members having two skin contact areas may therefore be placed closer to the leading longitudinal side of the razor cartridge. Then, the blades of the cutting members having two skin contact areas have a lifetime comparable to the blades closer to the trailing longitudinal side of the razor cartridge. In prior art razor cartridges the blades closer to the leading longitudinal side become blunted more easily. A user must dispose of a razor cartridge even when one blade of a plurality of blades becomes blunted. Previously, a user would need to dispose of a razor cartridge having blunt blades closer to the leading longitudinal side even if the blades closer to the trailing longitudinal side of the razor cartridge were acceptably sharp. According to the present aspects, the wear rate on the blades closer to the trailing longitudinal side of the razor cartridge and the leading longitudinal side of the razor cartridge is more equal.

The present razor cartridge may in particular be more suited to infrequent razor users who wait several days between shaving. Such behaviour leads to a requirement for a greater degree of hair removal compared to the case of a user who shaves daily. A razor cartridge according to the present disclosure is better adapted to e.g. users who shave less frequently, because the wear rate of blades at the leading longitudinal edge of the razor cartridge can be equalised with the wear rate of blades at the trailing longitudinal edge of the razor cartridge to accommodate the denser and/or longer hair clippings characteristic of users who shave less frequently.

A cutting edge plane is defined as the plane intersecting the first and second skin contact areas of, for example, cutting edges of the shaving head (in a two-dimensional cut-through, the cutting edge plane would be a tangential line intersecting the cutting edges of the blades).

A shaving plane is typically defined by the most prominent members of the housing of a razor cartridge. For example, the shaving plane is defined as the plane between a guard member and a cap member that contact a user, in use. The shaving plane represents the theoretical position of the surface being shaved. Based on that, an exposure (of the cutting edge plane with respect to the shaving plane) can be designated as negative, neutral or positive.

As will be described in this specification, the razor cartridge comprises at least two different types of cutting member. One type of cutting member comprises blades mounted below their blade supports support, as defined and illustrated subsequently (i.e. blades mounted on a support mounting surface that in use faces away from the shaving plane). A local exposure is designated as the vertical distance between a cutting edge and a support plane, wherein the support plane is defined by a tangential line intersecting the tips of the blade supports.

Further embodiments are presented in the dependent claims, and the detailed description, to which the reader should now refer.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
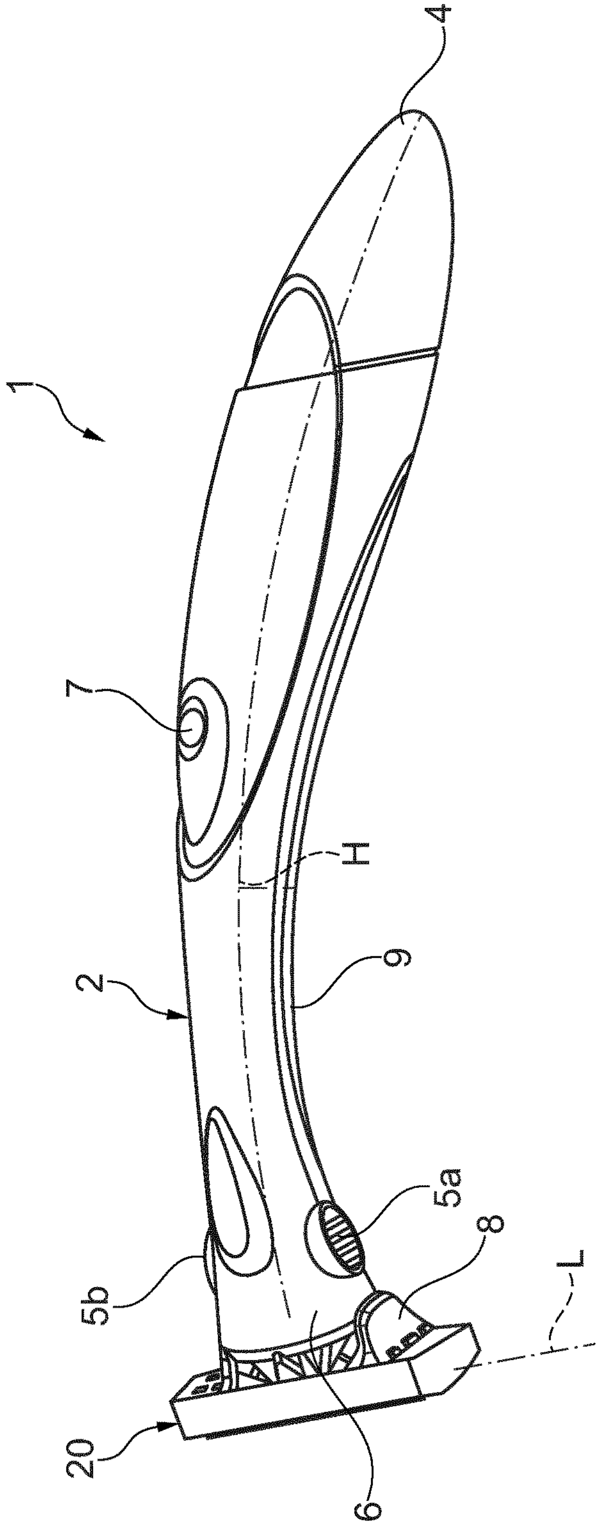
FIG. 1 is a perspective view of a shaving razor assembly according to the third aspect.

FIG. 1 is a perspective view of a shaving razor assembly 1 according to a third aspect. The shaving razor assembly comprises blades which are not driven by a motor. The shaving razor assembly 1 comprises a handle 2 extending in a handle direction H between a proximal portion 4 and a distal portion 6 of the handle 2. A razor cartridge 20 is mounted at the distal portion 6 of the handle 2. The razor cartridge 20 will be presented in more detail following discussion of the shaving razor assembly 1.

The mounting of the razor cartridge 20 to the distal portion 6 of the handle 2 in the illustration is via a pivotable bearing member 8 enabling a frame of reference of the handle 2 to vary relative to a frame of reference of the razor cartridge 20, to thus enable the angle of the razor cartridge against the skin of a user to vary and adapt to changes during use.

In particular, the razor cartridge 20 pivots relative to the handle 2 about the longitudinal axis L of the razor cartridge 20, in use. The pivoting enables the user to adapt to contours of the body, for example. The longitudinal axis L of the razor cartridge 20 is substantially perpendicular to the shaving direction along the handle 2. Another example of a connection mechanism for connecting the razor cartridge 20 to the handle 2 is discussed in WO2006/027018 A1. Another alternative is a razor cartridge 20 that may pivot relative to a second pivot axis (a rocking axis), substantially perpendicular to axis L.

In examples, the pivotable bearing member 8 may be omitted (not illustrated) and the handle 2 provided as an integrally connected part of the support of the razor cartridge 20.

In an example, the pivotable bearing member 8 may further comprise, or be replaced by, a release mechanism 5*a*, 5*b*, enabling rapid release of an exhausted razor cartridge from the handle 2. In an example, the handle 2 and the support of the razor cartridge 20 are integrally formed with a pivotable bearing member (not illustrated) such as a plastic spring member.

In an example, the handle 2 is provided with a handle grip 9 formed of a rubber, or rubber-like material to improve gripping friction. In an example, the handle is provided with a thumb-rest 7 to enable a more secure grip of the handle 2 by a user.

Figure 2A:
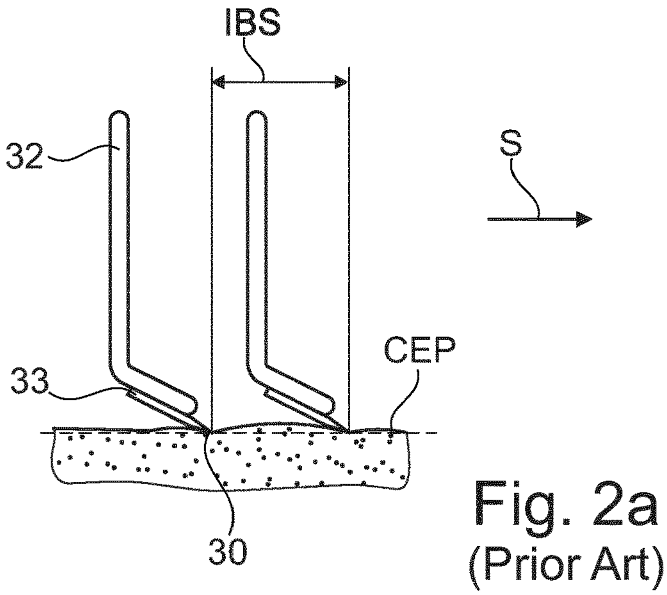
Fig. 2a (Prior Art)
FIGS. 2*a* and 2*b* schematically illustrate side views of a portion of a prior art razor cartridge in use.
Figure 2B:
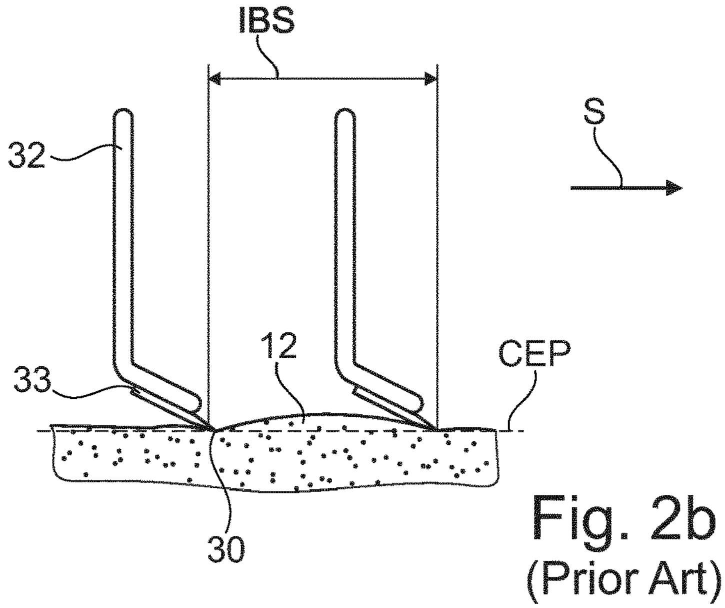
Fig. 2b (Prior Art)

FIGS. 2*a* and 2*b* are schematic side views of a portion of a prior art razor cartridge in use. In conventional razor cartridges with three or more blades, the inter-blade span is measured to be constant in a range of about 1.05 mm to 1.5 mm, and the razor blade is mounted on the top of the blade support.

The phrase "top of the blade support" for the purposes of this specification means a side of a blade support of a razor cartridge that is closest to a shaving plane SH (skin) of a user when the razor cartridge is in use, as illustrated in FIGS. 2*a*, 2*b*, 8*a*, 8*b*, and 9. When a razor cartridge with such top-mounted cutting members is used, aggressive shaving may result in an increased degree of nicks and cuts and an increased sense of irritation, because the cutting edge plane CEP (skin) is exclusively supported by the cutting edges 30 of the blades on the blade support. This provides the skin with a relatively small surface to be supported on during shaving, and causes an increased degree of "bulging" 12 of the cutting edge plane CEP (skin) between the inter-blade gaps.

The wear-rate of cutting members near to the leading longitudinal side (front) of a prior art razor cartridge may be greater than the wear rate of top-mounted cutting members near to the trailing longitudinal side (rear) of the prior art razor cartridge.

Figure 3:
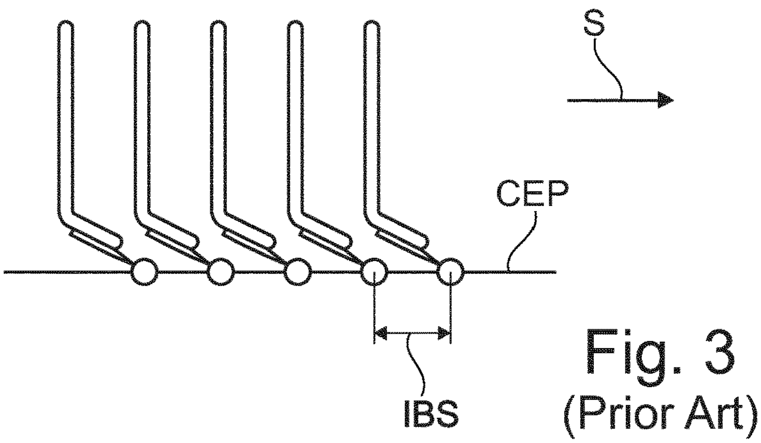
Fig. 3 (Prior Art)
FIG. 3 is a schematic side view of a portion of a prior art razor cartridge in use.

FIG. 3 is a schematic side view of a portion of a prior art razor cartridge in use. To reduce the effect of skin bulging 12, the inter-blade span IBS can be reduced, as illustrated in FIG. 3. However, this results in a reduced gap for rinsing, and debris such as foam or hair can easily block a gap having a narrow inter-blade span. A greater blade density (number of blades in the same-sized cartridge) is also required when the IBS between all blades is reduced.

Therefore, conventional razor cartridges can be further improved.

According to a first aspect, there is provided a razor cartridge 20 comprising a housing 21 extending longitudinally along a longitudinal axis (x), wherein the housing comprises a leading longitudinal side 24, a trailing longitudinal side 25, and a cutting member mounting portion 19 in-between the leading 24 and trailing 25 longitudinal sides for accommodating a plurality of cutting members 29.

A plurality of cutting members 29 is disposed at least partially in the cutting member mounting portion 19. Each cutting member 28 is arranged between the leading longitudinal side 24 and the trailing longitudinal side 25 of the razor cartridge 20 in a shaving direction S of the razor cartridge 20. One or more of the cutting members 28 comprises a blade support 32 having a blade mounting portion 70, and a blade 33 attached to the blade mounting portion 70.

The cutting members 28 comprised in the plurality of cutting members 29 are configured such that, in use, a total number of skin contact areas of the cutting members 28 with a user along a transverse cutting member contact axis P-Q is at least one greater than a total number of cutting members 28 comprised within the plurality of cutting members 29. In examples, a total number of skin contact areas of the cutting members 28 with a user along a transverse cutting member contact axis P-Q may be at least one fewer than two times the total number of cutting members 28 of the plurality of cutting members 29.

In this application, the term "skin contact area" means a part of the arrangement of cutting members 28 that comes into contact with the skin of a user of the razor cartridge in normal use. Of course, many parts of the housing, guard, and cap element will also contact the skin of a user during normal use of the razor cartridge, but the term "skin contact area" means the section of a cutting edge 33*a-f* of one of the blades of the razor cartridge 20, or the section of the edge of the blade support 30*ax* that contact the skin of a user in normal use. Therefore, when a plurality of cutting members 28*a*-28*f* is provided, there will be a plurality of skin contact areas in normal use. A subset 28*a*, 28*b* of the cutting members provided may contact the skin at both a cutting edge 33*a*, 33*b* and a front edge of the blade support. Therefore it is not essential that every skin contact area functions to cut a hair of the user. The skin contact areas provided by the front edge of the blade supports 30*ax*, 30*bx* function to provide support to the skin surface such that the overall pressure on the skin at the cutting edges 33*a*, 33*b* is reduced. Viewed alternatively, the skin contact areas provided by the front edge of the blade supports 30*ax*, 30*bx* functions to reduce an inter-blade span, to thus reduce the size of skin bulges.

In an example, the skin contact portions 30*ax*, 30*bx* of the blade supports 32*a*, 32*b* are rounded or chamfered to improve glideness properties of the cutting members 28*a*, 28*b*.

Figure 4:
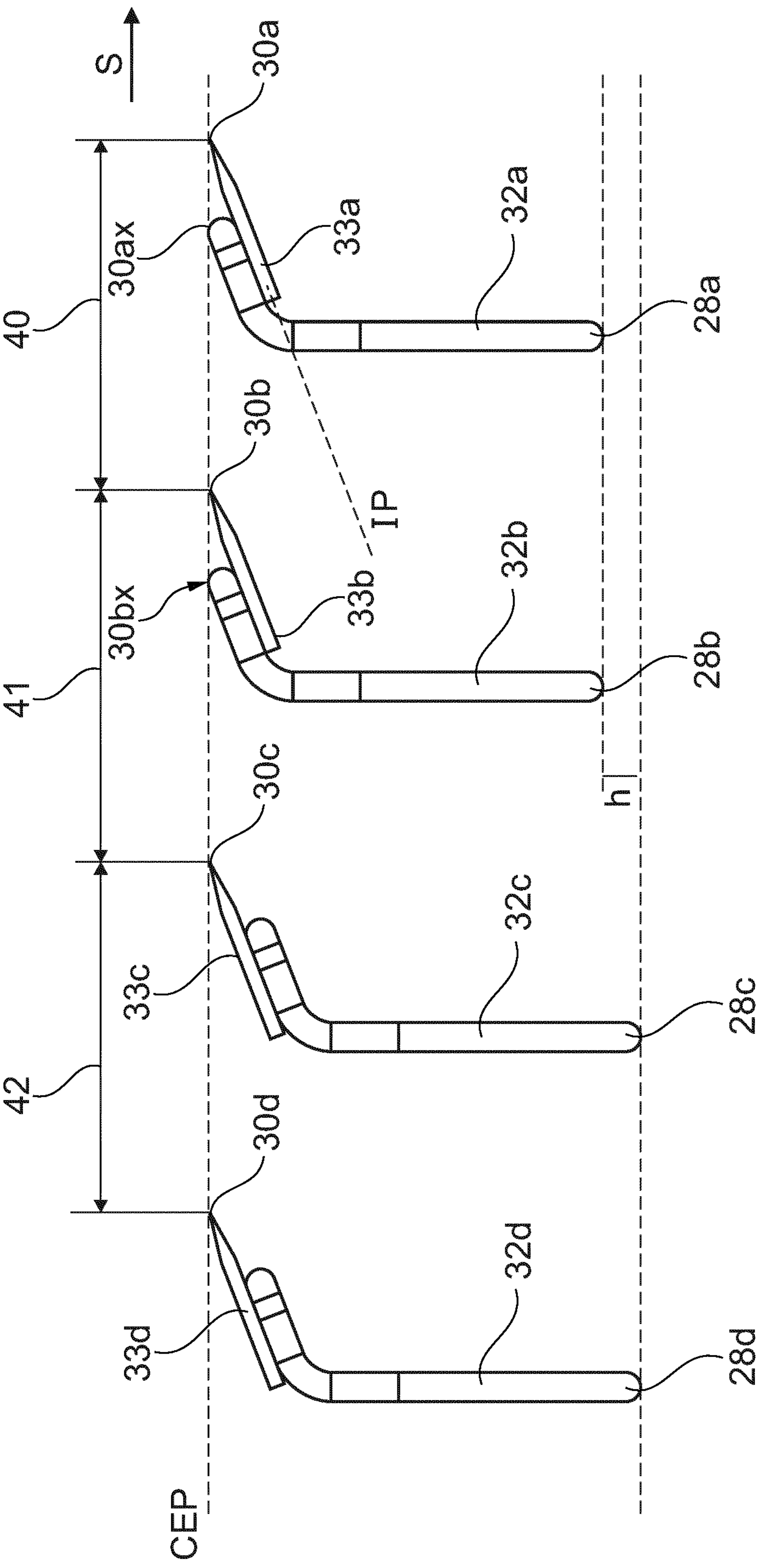
FIG. 4 illustrates a schematic side view of four cutting members of a razor cartridge according to an embodiment.

FIG. 4 illustrates a schematic side view of four cutting members 28*a*-28*d* of a plurality of cutting members 29 to illustrate the general concept discussed in this specification according to an embodiment with four cutting members 28*a-d*. The surrounding structure of a razor cartridge 20 is not illustrated as an aid to clarity.

The plurality of cutting members 29 are, in use, drawn across the skin of the user (approximated by the cutting edge plane CEP) in the shaving direction S. The cutting members 28*a*-28*d* of the plurality of cutting members 29 may not be homogeneous. In other words, the at least one cutting member 28*c* in the plurality of cutting members may have a different design compared to the other cutting members 28*a*, 28*b*.

In general terms, the first two cutting members 28*a* and 28*b* comprise blades 33*a* and 33*b* mounted below their respective blade supports 32*a* and 32*b*, with respect to the shaving plane SH and cutting edge plane CEP. The second two cutting members 28*c* and 28*d* may comprise blades 33*c* and 33*d* mounted above their respective blade supports 32*c* and 32*d*, with respect to the shaving plane SH and cutting edge plane CEP.

The designation that a blade 33*c* and 33*d* is "mounted above" a blade support means that a second blade mounting portion is disposed on an outer surface of the first blade support 32*a* that, in use, faces towards a shaving plane SH and cutting edge plane CEP, and the first blade 33*a* is attached to the second blade mounting portion.

In other words, a blade 33*c* that is "mounted above" its blade support 32*c* defines an imaginary plane that (i) intersects with the cutting edge plane CEP at the cutting edge 30*c*, and the same imaginary plane (ii) does not pass through (interfere with) any portion of the support member 32*c* to which the same blade 33*c* is attached.

The designation that a blade 33*a,b* is "mounted below" a blade support means that a first blade mounting portion is disposed on an inner surface of the first blade support 32*a* that, in use, faces away from a shaving plane SH (the cutting member is disposed such that in use faces away a shaving surface, for example the skin), and a cutting edge plane CEP, and the first blade 33*a* is attached to the first blade mounting portion. This may alternatively be referred to as a hanging blade.

In other words, a blade 33*a* that is "mounted below" its blade support 32*a* defines an imaginary plane that (i) intersects with the cutting edge plane CEP at the cutting edge 30*a*, and the same imaginary plane (ii) must pass through (interfere with) a portion of the blade support 32*a* to which the same blade 33*a* is attached. In the illustration of FIG. 4, an example of an imaginary plane interfering with a portion of the blade support 32*a* is illustrated by the dotted extended line IP. The line crosses through the blade support 32*a*. A similar extension of a plane defined by blade 33*c* would not cross through the blade support 32*c*.

In FIG. 4, cutting members 28*a* and 28*b* comprise blades 33*a* and 33*b* that are mounted on blade mounting portions below their blade supports 32*a* and 32*b*, respectively. In other words, the blade mounting portions supports face away from the shaving plane SH and the cutting edge plane CEP.

In FIG. 4, cutting members 28*c* and 28*d* comprise blades 33*c* and 33*d* that are mounted on blade mount portions above their blade supports 32*c* and 32*d*, respectively. In other words, the blade mounting portions supports facing towards the shaving plane SH and the cutting edge plane CEP.

Therefore, in an embodiment, the skin contact area of one or more of the cutting members comprises a region of a blade support of the cutting member, and/or a cutting edge of a blade attached to the cutting member.

In an embodiment, the plurality of cutting members 29 comprises a first subset of a first type of cutting member 28*a* that, in use, has two skin contact areas 30*a* (cutting edge) and 30*ax* (front edge of the blade support) with a user along the transverse cutting member contact axis.

In an embodiment, the plurality of cutting members 29 comprises a second subset of a second type of cutting member 28*c* that, in use, has one skin contact area 30*c* (cutting edge) with a user along the transverse cutting member contact axis P-Q.

In an embodiment, the first subset of the plurality of cutting members 29 is disposed closer to the leading longitudinal side 24 of the cutting member mounting portion than the second subset, and wherein the second subset of the plurality of cutting members is disposed closer to the trailing longitudinal side 25 of the cutting member mounting portion compared to the first subset.

In an embodiment, the (integer) number of skin contact areas with a user along the transverse cutting member contact axis P-Q provided by the first type of cutting members 28*a* in the first subset of the plurality of cutting members 29 is twice the (integer) number of skin contact areas with a user (cutting edge plane CEP) along the transverse cutting member contact axis P-Q provided by the second type of cutting member 28*c*.

In an embodiment, the first type of cutting member 28*a* comprises a first blade support 32 having a first blade mounting portion disposed on an inner surface of the first blade support that, in use, faces away from a shaving plane SH and a cutting edge plane CEP and a first blade attached to the first blade mounting portion/surface.

In an embodiment, the second type of cutting member 28*c* comprises a second blade support having a second blade mounting portion disposed on an outer surface of the second blade support that, in use, faces towards a shaving plane SH and a cutting edge plane CEP, and a second blade 33*c* attached to the second blade mounting portion.

In embodiments, the blade supports of each cutting member 28*a*, 28*b* belonging to the first subset of the plurality of cutting members 29 further comprise a base portion 80 for attaching the blade supports to the razor cartridge 20, the blade mounting portion, a curvilinear portion intermediate to the base portion and the blade mounting portion, and the blade mounting portion is disposed on an inner surface that, in use, faces away from a shaving plane SH and a cutting edge plane CEP.

A first skin contact area 30*ax* of the cutting member belonging to the first subset of the plurality of cutting members is at least a portion of the blade support that is defined on an outer surface of the blade mounting portion that, in use, faces towards the shaving plane SH and a cutting edge plane CEP.

In use, cutting member 28*a* has two areas of contact with the cutting edge plane CEP. The first area of contact with the cutting edge plane CEP is the cutting edge 30*a*. The second area of contact with the cutting edge plane CEP is the front edge 30*ax* of the cutting member 28*a*. Cutting member 28*b* similarly comprises two areas of contact with the cutting edge plane CEP, the cutting edge 30*b* and the front edge 30*bx* of the cutting member 28*b*.

In use, cutting member 28*c* has one area of contact with the cutting edge plane CEP—the cutting edge 30*c*. The cutting member 28*d* has one area of contact with the cutting edge plane CEP in use—the cutting edge 30*d*.

In examples, the blade supports 32*a* and 32*b* may be the same type (for example, dimensions and material thickness) as the blade supports 32*c* and 32*d*, to reduce the bill of material cost. In this case, the blade supports 32*a* and 32*b* (comprising two cutting edge plane CEP contact areas) are, for example, mounted at a height deviation h above the mounting height of the blade supports 32*c* and 32*d* (comprising one cutting edge plane CEP contact area), in order to ensure that the cutting edges 30*a* and 30*b* are coplanar with the cutting edges 30*c* and 30*d*.

In examples, the blade supports 32*a* and 32*b* may be of a different type, for example longer than the blade supports 32*c* and 32*d* so that the cutting edges 30*a*-30*d* are coplanar without requiring blade supports 32*a* and 32*b* to be mounted with a height deviation h.

A leading inter-blade span 40 is the span that is perpendicular to, and spans, the cutting edge plane CEP between cutting-edges 30*a* and 30*b*. A first intermediate inter blade span 41 is the span that is perpendicular to the second and third cutting edges in the cutting edge plane CEP between cutting-edge 30*b* and 30*c*. A trailing inter-blade span 42 is, in the example of FIG. 4, the span the span that is perpendicular to, and spans, the second and third cutting edges in the cutting edge plane CEP, 30*c* and 30*d*.

In examples, the leading inter-blade span 40, the first intermediate inter-blade span 41, and the trailing inter-blade span 42 are substantially equal. In examples, the leading inter-blade span 40 is greater than the first intermediate inter-blade span 41. In examples, the leading inter-blade span 40 is greater than the first intermediate inter-blade span 41, and the first intermediate inter-blade span 41 is greater than the trailing inter-blade span 42. In examples, the leading inter-blade span 40 is less than the first intermediate inter-blade span 41. In examples, the leading inter-blade span 40 is less than the first intermediate inter-blade span 41, and the first intermediate inter-blade span 41 is less than the trailing inter-blade span 42.

According to embodiments, the first cutting member 28*a* and the second cutting member 28*b* (the cutting members 28 comprising blades 33 held underneath the blade supports 32) are comprised in a first subset of the plurality (group) of cutting members 29.

According to embodiments, the third cutting member 28*c* and the fourth cutting member 28*d* (the cutting members 28 comprising blades 33 held above the blade supports 32) are comprised in a second subset of the plurality of cutting members 29.

In other words, each of the blade supports 32 of cutting members 28 in the first subset of the plurality of cutting members comprises a cutting edge plane CEP contact portion 30*ax*, 30*bx* that is configured, in use, to contact the cutting edge plane CEP in addition to the cutting edge 33 or edges of the blade or blades, thereby reducing the pressure at cutting edge contact areas with the cutting edge plane CEP.

Figure 5:
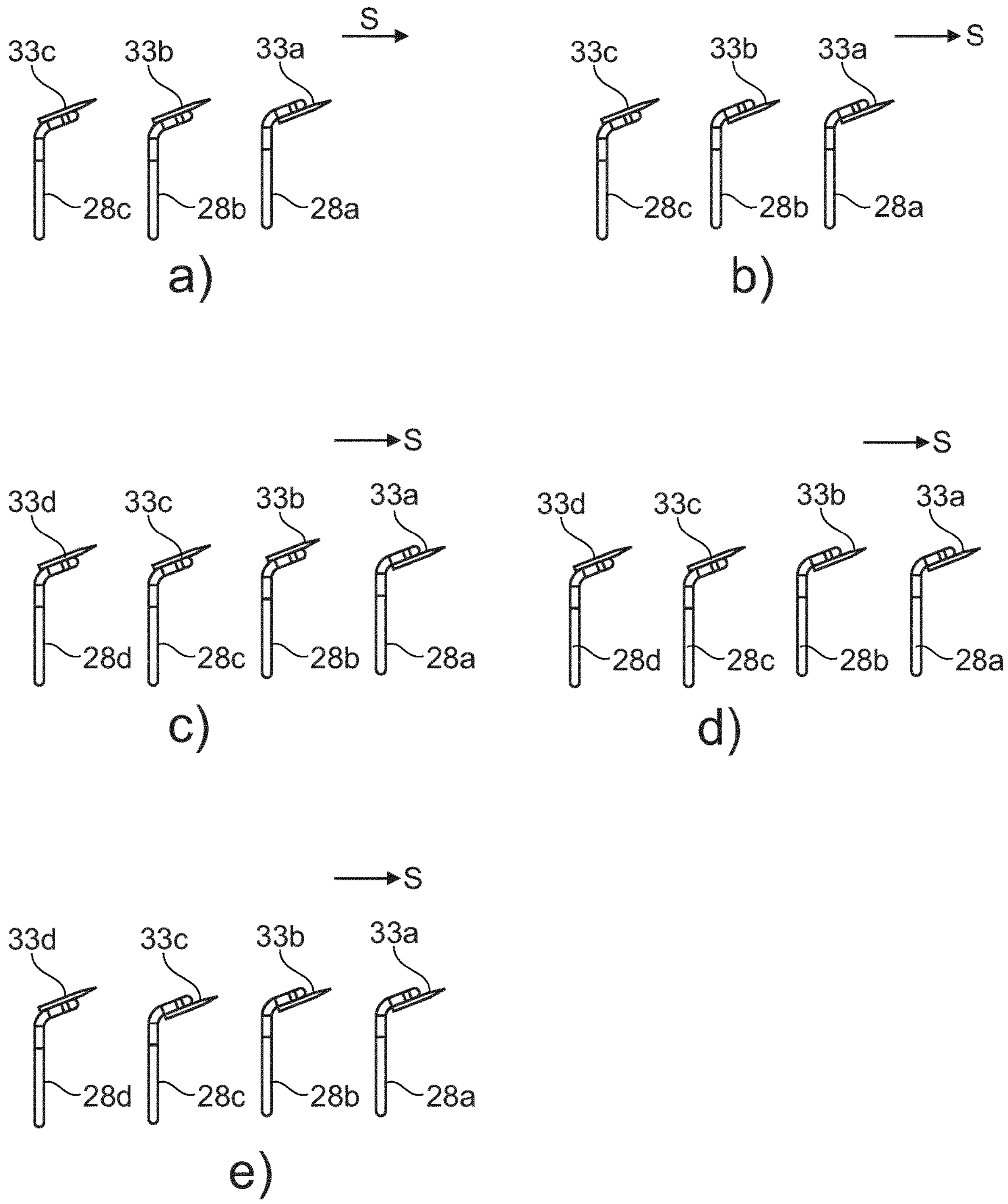
FIG. 5 schematically illustrates different examples of blade mounting arrangements.

FIG. 5 schematically illustrates different embodiments for mounting the cutting members comprised in the plurality of cutting members 29.

FIG. 5*a* schematically illustrates a plurality (group) of three cutting members 29 comprising a leading cutting member 28*a* having a blade 33*a* facing away from the shaving plane SH and the cutting edge plane CEP, and two trailing cutting members 28*b*, 28*c* having blades 33*b*, 33*c* facing towards the cutting edge plane CEP and the shaving plane SH.

FIG. 5*b* schematically illustrates a plurality (group) of three cutting members 29 comprising a leading cutting member 28*a* and intermediate cutting member 28*b* having blades 33*a* and 33*b* facing away from the shaving plane SH, and the cutting edge plane CEP and a trailing cutting members 28*c* having blade 33*c* facing towards the shaving plane SH and the cutting edge plane CEP.

FIG. 5*c* schematically illustrates a plurality (group) of four cutting members 29 comprising a leading cutting member 28*a* having a blade 33*a* facing away from the shaving plane SH and the cutting edge plane CEP, and three trailing cutting members 28*b*, 28*c*, 28*d* having blades 33*b*, 33*c*, 33*d* facing towards the shaving plane SH and the cutting edge plane CEP.

FIG. 5*d* schematically illustrates a plurality (group) of four cutting members 29 comprising a leading cutting member 28*a* and a first trailing cutting member 28*b* having blades 33*a* and 33*b* facing away from the shaving plane SH and the cutting edge plane CEP, and two trailing cutting members 28*c*, 28*d* having blades 33*c*, 33*d* facing towards the cutting edge plane CEP and the shaving plane SH.

FIG. 5*e* schematically illustrates a plurality (group) of four cutting members 29 comprising a leading cutting member 28*a* and two trailing cutting members 28*b*, 28*c* having blades 33*b*, 33*c* facing away from the shaving plane SH and the cutting edge plane CEP, and one trailing cutting member 28*d* having blades 33*d* facing towards the shaving plane SH and the cutting edge plane CEP.

Of course, further exemplary permutations are possible, such as those comprising five or six blades, or more.

According to embodiments, the first subset of the plurality of cutting members comprises two consecutive cutting members that, in use, face away from the shaving plane.

According to embodiments, the first subset of the plurality of cutting members comprises three consecutive cutting members that, in use, face away from the shaving plane.

According to embodiments the second subset of the plurality of cutting members comprises two consecutive cutting members that, in use, face towards the shaving plane.

According to embodiments the second subset of the plurality of cutting members comprises three consecutive cutting members that, in use, face towards the shaving plane.

According to some embodiments the previously discussed concept the concept of a plurality of cutting members with a combination of blades mounted above and below their respective supports is provided. However this is not essential, and the provision of a plurality of cutting members configured such that in use a total number of skin contact areas is at least one greater than a total number of cutting members comprised in a plurality of cutting members can be provided in other ways.

Figure 6:
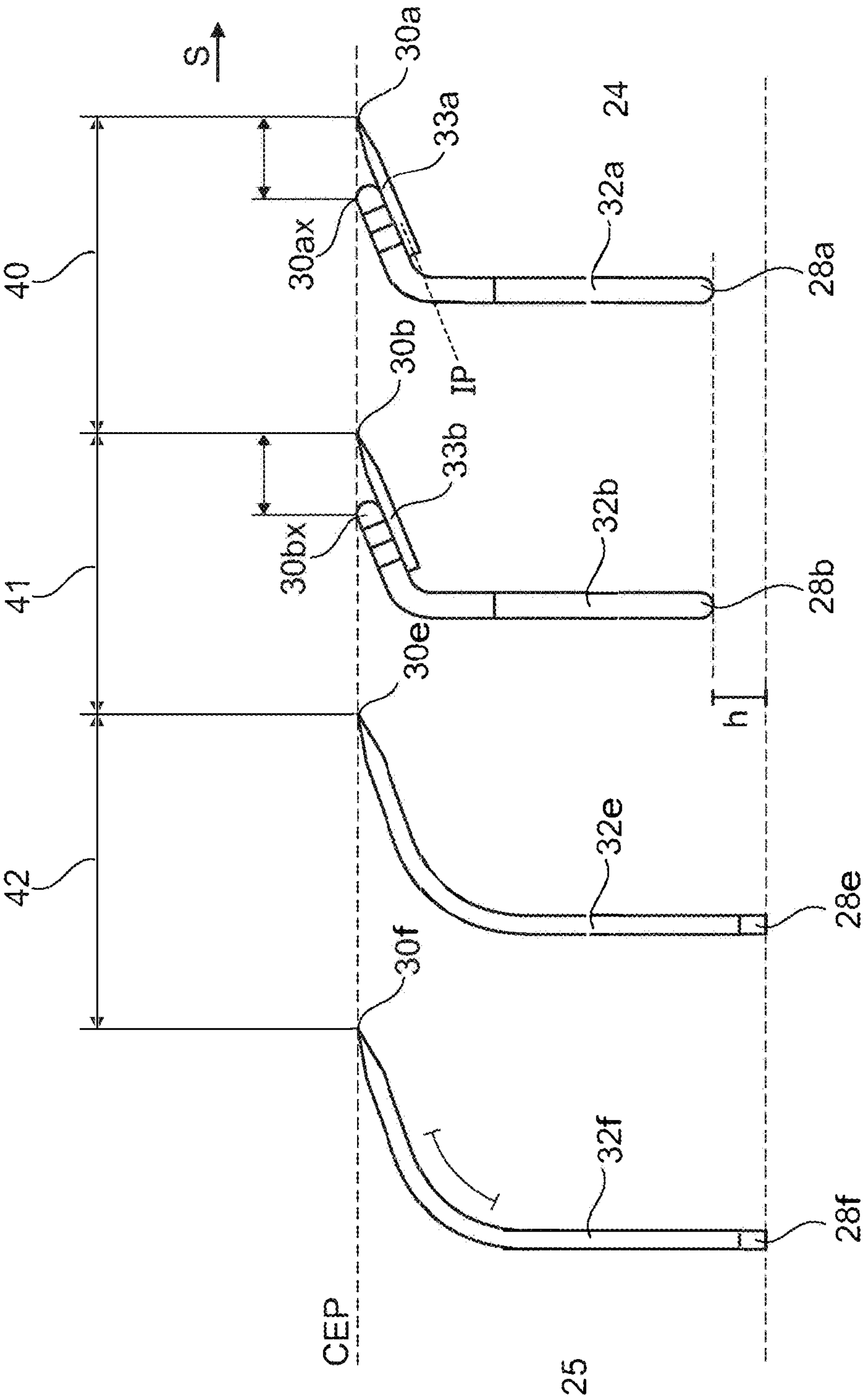
FIG. 6 illustrates schematic side views of four cutting members of a razor cartridge according to another embodiment.

FIG. 6 illustrates a schematic side view of a plurality of cutting members comprising four cutting members of a razor cartridge 20 according to another embodiment.

Cutting members 28*a* and 28*b* are provided as cutting members with the blade underneath the blade support as described in relation to the embodiment of FIG. 4. The embodiment of FIG. 6 comprises two integrally formed cutting members 28*e* and 28*f*.

The integrally formed cutting members 28*e* and 28*f* are provided, for example, as unitary metal or metal alloy members. The integrally formed cutting members 28*e* and 28*f* comprise, at their distal ends, cutting edges 30*e* and 30*f* respectively, and at their proximal ends a blade mounting area. The integrally formed cutting members 28*e* and 28*f* illustrated in FIG. 6 comprise a radiused or curvilinear portion 82 that gradually aligns blade support portions 32*e* and 32*f* of the integrally formed cutting members 28*e* and 28*f* so that the cutting edges 30*e* and 30*f* of the integrally formed cutting members 28*e* and 28*f* have a controlled shaving angle to the cutting edge plane CEP. In an example, the integrally formed cutting members 28*e* and 28*f* are rigid.

In examples, shaving angle is the same as for cutting edges 30*a* and 30*b*, for example. In examples, the shaving angle of the cutting edges 30*e* and 30*f* of the integrally formed cutting members 28*e* and 28*f* may be different to the shaving angle of cutting edges 30*a* and 30*b*, for example.

Similarly, the exposure of the cutting edges 30_e_ and 30_f_ of the integrally formed cutting members 28_e_ and 28_f_ relative to the shaving plane SH may be the same as the exposure of the cutting edges 30_a_ and 30_b_ (as illustrated in FIG. 6). Alternatively, the exposure of the cutting edges 30_e_ and 30_f_ greater than the exposure of the cutting edges 30_a_ and 30_b_, or less than the exposure of the cutting edges cutting edges 30_a_ and 30_b_.

Therefore, FIG. 6 illustrates an alternative embodiment having four cutting members 28_a_, 28_b_, 28_c_, 28_d_ that provide six contact points 30_a_, 30_ax_, 30_b_, 30_bx_, 30_c_, and 30_d_ with the cutting edge plane CEP. Of course, a skilled person will realise that many combinations of integrally formed cutting members 28_c_ and 28_d_ with cutting members 28_a_, 28_b_ having blades mounted below the blade support can be provided.

In FIG. 6, the cutting members 28_a_, 28_b_ having blades mounted below the blade support are illustrated as being closer to the leading longitudinal side 24 of a razor cartridge 20 compared to the integrally formed cutting members 28_c_ and 28_d_. In embodiments, cutting members 28_a_, 28_b_ having blades mounted below the blade support are provided closer to the trailing longitudinal side 25 of a razor cartridge 20 compared to the integrally formed cutting members 28_c_ and 28_d_. In embodiments, the cutting members 28_a_, 28_b_ having blades mounted below the blade support are interleaved with integrally formed cutting members 28_c_ and 28_d_ along the transverse direction of the razor cartridge 20 in any sequence.

Therefore, the second type of cutting member comprises an integrally formed rigid razor blade having a cutting-edge portion extending about a cutting-edge portion plane, and having a cutting edge 30_c_, 30_d_ at one end, a base portion 80 extending along a base portion plane, and a curvilinear portion 82 intermediate the cutting-edge portion and the base portion 80.

Figure 7:
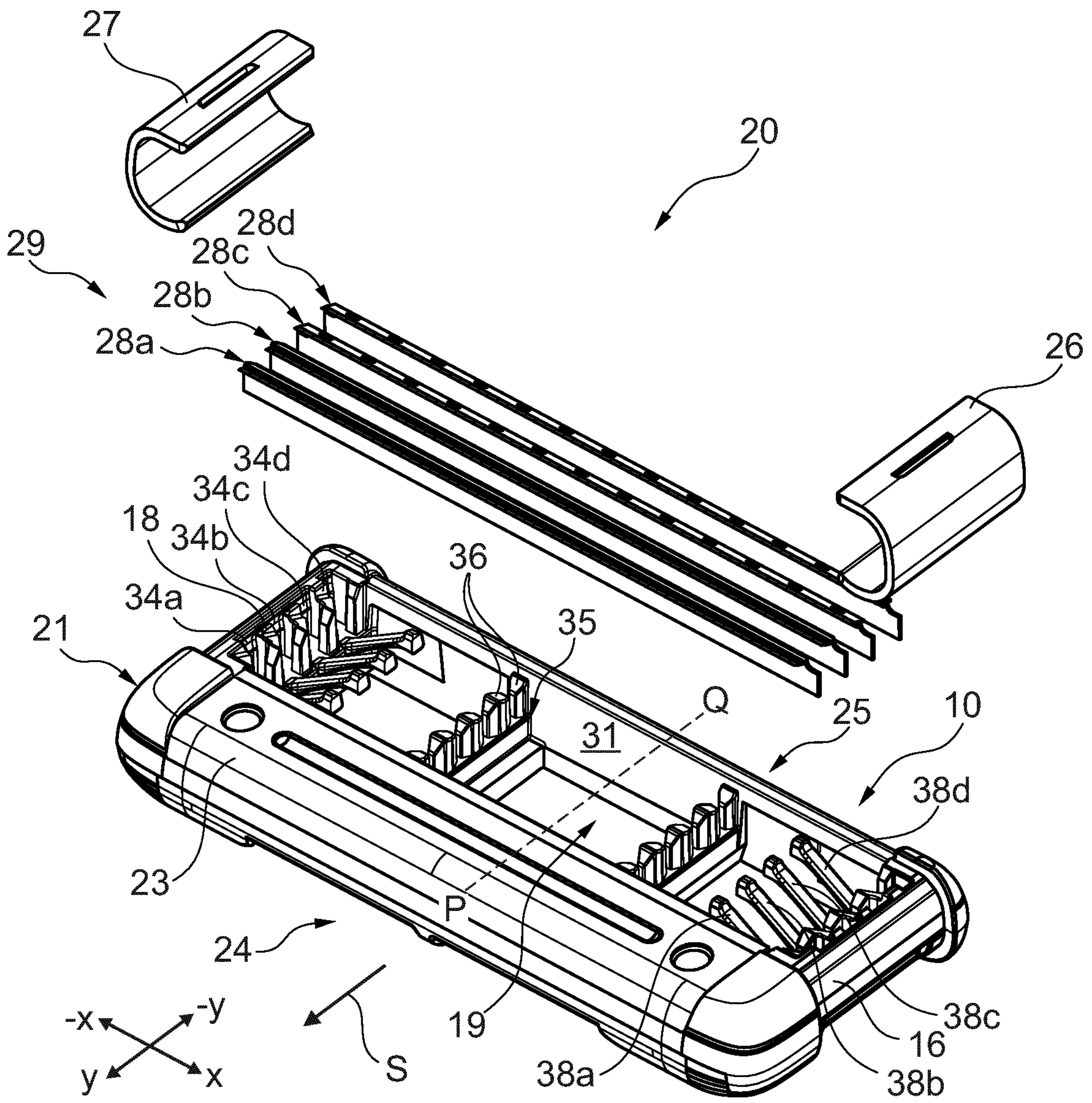
FIG. 7 is a perspective partial exploded view of a razor cartridge according to an embodiment.

FIG. 7 is a perspective partial exploded view of a razor cartridge 20 according to an embodiment of the first aspect. "Partial exploded view" means that minor components of the razor cartridge 20 have been omitted from the exploded view to aid the clarity of the drawing.

The shaving direction S is depicted in FIG. 7 using arrow S. In use, the razor cartridge 20 contacts a cutting edge plane CEP (not shown in FIG. 7), and is translated across the cutting edge plane CEP in the direction of arrow S.

In an embodiment, a transverse cutting member contact axis P-Q (illustrated in FIG. 7) of the razor cartridge is defined as an axis that is perpendicular to the longitudinal axis x of the razor cartridge 20, coplanar with the cutting edge plane CEP, and which passes through each cutting member 28_a-e_ of the plurality of cutting members 29.

In the example, the housing comprises a housing 21 fabricated partially or completely of synthetic materials, such as plastic, resin, or elastomers. In embodiments, the housing is integrally formed. In embodiments, the housing is formed from a plurality of sub-assemblies that are joined together by joining methods such as adhesive bonding, interference fitting, or ultrasonic or thermal welding, for example.

The housing 21 comprises a platform member (not shown) connectable to a handle 2 (for example, as shown in FIG. 1) of a shaving razor assembly 1 either integrally, or by a connection mechanism such as a pivotable bearing member 8 or by an interconnecting member (not shown).

In the example, a guard member 23 is provided on the leading longitudinal edge of the razor cartridge 20. In use, the guard member 23 is the first portion of the razor cartridge 20 to contact uncut hairs. The side of the razor cartridge 20 opposite to the leading longitudinal side of the razor cartridge 20 and opposite to the shaving direction is the trailing longitudinal side 25 of the razor cartridge 20. The trailing longitudinal side 25 is thus the final portion of the razor cartridge 20 to contact the cutting edge plane CEP, in use.

It will be noted that the terms "leading longitudinal side 24" and "trailing longitudinal side 25" are used to label specific locations on the razor cartridge 20, and do not imply or require the absence or presence of a particular feature. For example, a guard member 23 may in one example be located at the "leading longitudinal side 24" but it is not essential that this location comprises such a feature.

The guard member 23, in an example, comprises an elastomeric member (not shown in FIG. 6). In an example, the elastomeric layer comprises one or more fins extending longitudinally in parallel to the guard member 23 and substantially perpendicularly to the shaving direction. One purpose of such an elastomeric layer is, for example, to tension the skin prior to cutting.

The razor cartridge 20 further comprises a plurality of cutting members 29 accommodated in cutting member mounting portion 19 (in an example, a recess) and attached using a blade receiving section 31 of the housing 21. The plurality of cutting members 29 comprises a plurality of cutting members 28_a-d_. The plurality of cutting members 29 is disposed in the housing 21 longitudinally and perpendicular to the shaving direction S such that in use, blades of the cutting members 28_a-d_ contact a cutting edge plane CEP and cut hair of a user present in contact with the cutting edge plane CEP as the razor cartridge 20 is moved across the cutting edge plane CEP in the shaving direction S.

The particular design of the plurality of cutting members 29 illustrated in the embodiment of FIG. 6 has been discussed previously in relation to the blade arrangement illustrated in FIG. 4. However, at least the blade arrangements illustrated in FIG. 5 may also be provided as the plurality of cutting members.

In an example, a razor cartridge 20 is provided with a plurality of cutting members 29 comprising two cutting members. In an example, a razor cartridge 20 is provided with a plurality of cutting members 29 comprising three cutting members. In an example, a razor cartridge 20 is provided with a plurality of cutting members 29 comprising four cutting members. In an example, a razor cartridge 20 is provided with a plurality of cutting members 29 comprising five cutting members. In an example, a razor cartridge 20 is provided with a plurality of cutting members 29 comprising six cutting members. In an example, a razor cartridge 20 is provided with a plurality of cutting members 29 comprising seven or more cutting members.

The plurality of cutting members 29 defines a plurality of substantially parallel inter-blade spans. The number of inter-blade spans is one fewer than the number of cutting members 28_a-d_.

The housing 21 comprises first 16 and second 18 side portions. The housing 21 comprises, for example, first retainer 26 and second retainer 27 configured to mate resiliently with the respective first 16 and second 18 side portions to confine the cutting members within the razor cartridge 20 housing, although other retaining mechanisms are known to a skilled person and are not excluded. When the razor cartridge 20 is in an assembled state, the first and second side portions 16, 18 are configured to confine the longitudinal ends of the guard member 23, and the cutting members 28_a_-28_d_ of the plurality of cutting members 29. The first retainer 26 and second retainer 27 may comprise, for example, plastic, an elastomer, a resin, a metal or metal alloy material and furthermore may be of a different shape to that illustrated.

The razor cartridge 20 of FIG. 6 further comprises four resilient fingers 38*a*, 38*b*, 38*c*, 38*d* provided in the vicinity of the first retainer 26. The razor cartridge 20 comprises four resilient fingers provided in the vicinity of the second retainer 27 that are in transverse corresponding alignment with the four resilient fingers 38*a*, 38*b*, 38*c*, 38*d* under the first retainer 26. In an example, the resilient fingers 38 are integral with the housing and extend inwardly from the first 16 and second 17 sides.

In total, the eight resilient fingers each exert a bias force against respective cutting members of the plurality of cutting members 29 in the direction of the cutting edge plane CEP such that the cutting members of the plurality of cutting members 29 are in a rest position, when the razor cartridge 20 is assembled. In the rest position, the cutting edges 30 of the blades 33, at each lateral end of the blades 33 near the first 26 and second 27 retainers, bear against corresponding stop portions, for example. In an example, the stop portions may be the first 26 and second 27 retainer.

Accordingly, the rest position of the cutting members 28*a-d* is well defined, enabling a high shaving precision. Of course, the illustrated biasing arrangement has many variations. For example, a further plurality of resilient fingers may be provided on one or more of the cross members 35. In a simplified razor cartridge design (such as for low cost, disposable razors), the resilient fingers may be omitted. A skilled person will appreciate that the number of resilient fingers 38 to be provided is related to the number of cutting members 28*a-d* in the plurality of cutting members 29, and that fewer or more than eight resilient fingers 38 can be provided. It is not essential that the resilient fingers are provided as the skilled person is aware of other mounting means for the cutting members 28.

In an example, the biasing members are omitted.

A pivotable bearing member (not shown) may, in an example be provided on the handle side of the razor cartridge 20 configured to connect to a pivotable handle 2. Such a pivotable bearing member, in an example, comprises two or more shell bearings configured to connect to the pivotable bearing member 8 of the handle 2, although a skilled person is familiar with many attachment mechanisms of a razor cartridge to a handle which are not excluded.

As illustrated in FIG. 7, the cutting members comprised in the plurality of cutting members 29 are disposed in the razor cartridge 20 such that two cutting edges 30 comprised, respectively, on the two foremost cutting members 28*a* and 28*b* of the plurality of cutting members 29 (nearest to the leading longitudinal side of the razor cartridge) define a leading inter-blade span 40 that is closest to the leading longitudinal side 24 of the razor cartridge 20. The inter-blade spans are illustrated further in FIG. 8*b* and discussed subsequently.

Each cutting member in the plurality of cutting members 29 comprises a longitudinal blade support 32. A longitudinal blade is mounted on the blade support 32. The cutting edge 30 of a cutting member 28*a-d* is oriented forward in the direction of shaving S. The blade support 32 of a cutting member 28*a-d* is an elongated, partially curvilinear piece of rigid material. In an example, the blade support 32 is a metal such as austenitic stainless steel.

Each cutting member in the plurality of cutting members 29 is, in an example, resiliently mounted in a blade receiving section 31 of the razor cartridge 20. The blade receiving section 31 comprises a longitudinal space in the razor cartridge 20 that is sized to accommodate the plurality of cutting members 29. At least one cutting member of the plurality of cutting members 29, up to all cutting members in the plurality of cutting members 29 may be resiliently mounted on the resilient fingers 38 in the blade housing 21.

In the illustrated example of FIG. 7, the transverse inner sides of housing 21 comprise a plurality of holding slots 34. Each holding slot 34 on the transverse inner sides is configured to accept and retain one side of a blade support 32 of a cutting member of the plurality of cutting members 29 so that the cutting members of the plurality of cutting members 29 are held in the blade receiving section 31 with a substantially parallel inter-blade span. In embodiments, at least two or more of the cutting members are non-parallel to each other. Therefore, as many holding slots 34 are provided in each transverse inner side of housing 21 as there are blade support members.

Between the blade receiving section 31 and the handle (in a part adjacent to a handle 2 connection, for example) there are, in examples, provided one or more cross members 35 that are integrally formed with the housing 21. The cross members 35 may comprise a plurality of blade support guides 36 provided as a plurality of protuberances aligned with the holding slot 34 on the transverse inner sides of the housing 21. The blade support guides 36 function to provide an additional support to the blades in a direction parallel and perpendicular to the longitudinal direction, thus increasing the stability during use.

In examples, a razor cartridge 20 according to the first aspect has a variable inter-blade span IBS. Therefore, in one variant, the spacing of the blade supports 32 is progressively decreased between the leading longitudinal side 24 and the trailing longitudinal side 25 of the razor 20 to generate the variable inter-blade span IBS. One alternative way to achieve this arrangement is to progressively decrease the spacing between the holding slots 34 provided on the transverse inner sides in a transverse direction (y to −y) of the razor cartridge. The positioning and/or width of the blade support guides 36 is adjusted commensurately, such that space between the cutting edges 30 of the cutting members 28*a-d* is parallel.

Accordingly, FIG. 7 illustrates an example of a razor cartridge 20 having a total number of skin contact areas with a user (in use) that is at least one greater than the total number of cutting members comprised within a plurality of cutting members of the razor cartridge 20.

Figure 8A:
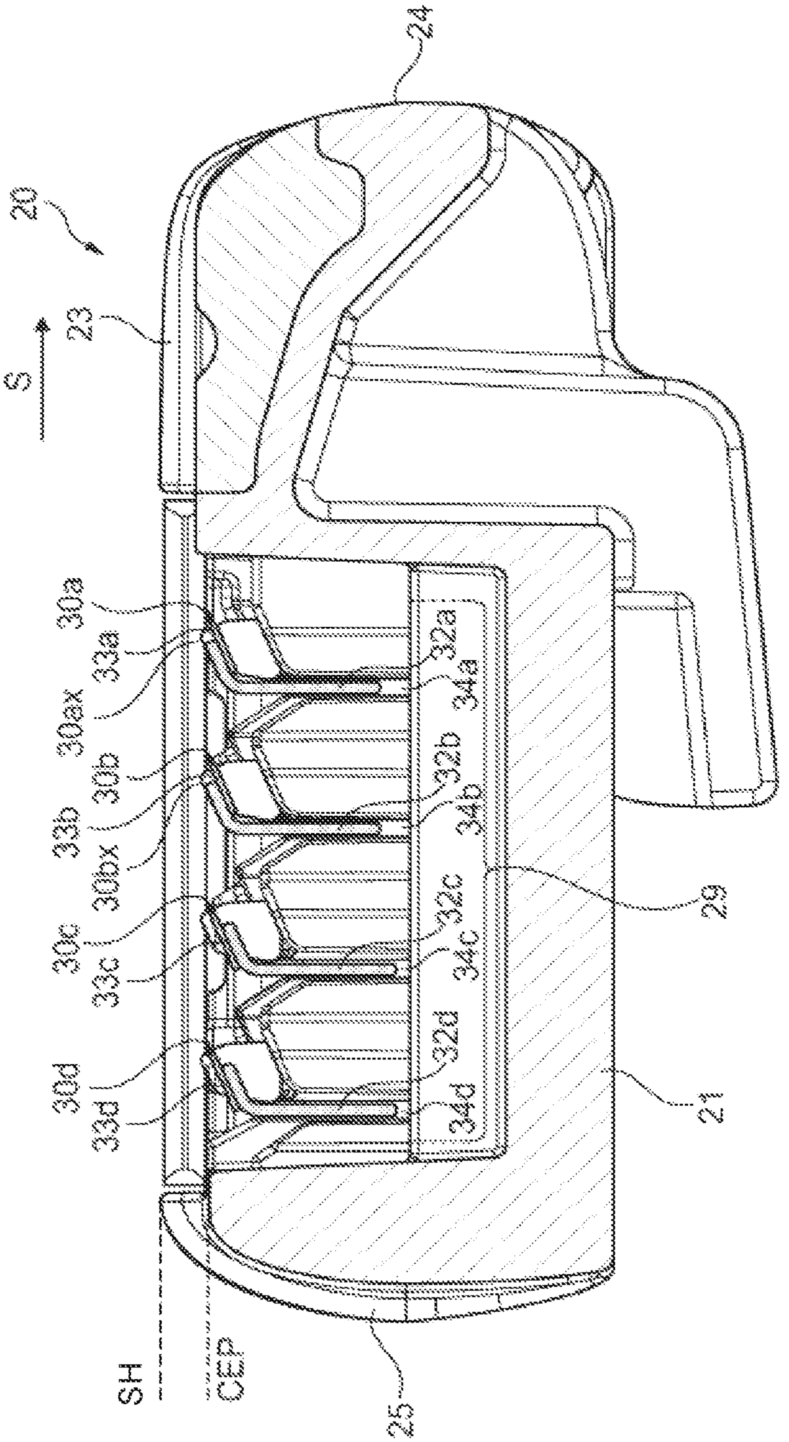
FIG. 8*a* is a schematic cutaway side view of the razor cartridge according to an embodiment illustrated in FIG. 6 along axis transverse cutting member contact access P-Q.

FIG. 8*a* is a schematic cutaway side view of a razor cartridge taken from the embodiment of FIG. 6 along transverse cutting member contact axis P-Q illustrated by the dotted line in FIG. 7. Where possible, like elements are denoted with like reference numerals.

FIG. 8*a* illustrates a side view of the holding slots 34*a-d* provided razor cartridge 20 for holding the cutting members 28*a-d* of the plurality of cutting members 29. The plurality of resilient fingers 38 shown in FIG. 6 is not shown in the projection of FIG. 8*a* to aid clarity.

FIG. 8*a* illustrates the altered orientation of the blades 33*a*-33*d* in the longitudinal direction the direction from the leading longitudinal side 24 to the trailing longitudinal side 25 of razor cartridge 20.

Of course, the provision of a succession of holding slots 34 in the first 26 and second 27 retainers to support the cutting members of the plurality of cutting members 29 is not essential. The plurality of cutting members 29 could also be supported using a plurality of blade support guides 36 (protuberances) positioned on one or more cross members 35, for example, where the plurality of blade support guides 36 provide a progressively decreasing inter-blade span in the longitudinal direction from the leading longitudinal side 24 to the trailing longitudinal side 25 of the razor cartridge 20. In an example, a plurality of blade support guides 36 and a succession of holding slots 34 may be used in combination to provide progressively decreasing span in the longitudinal direction.

Figure 8B:
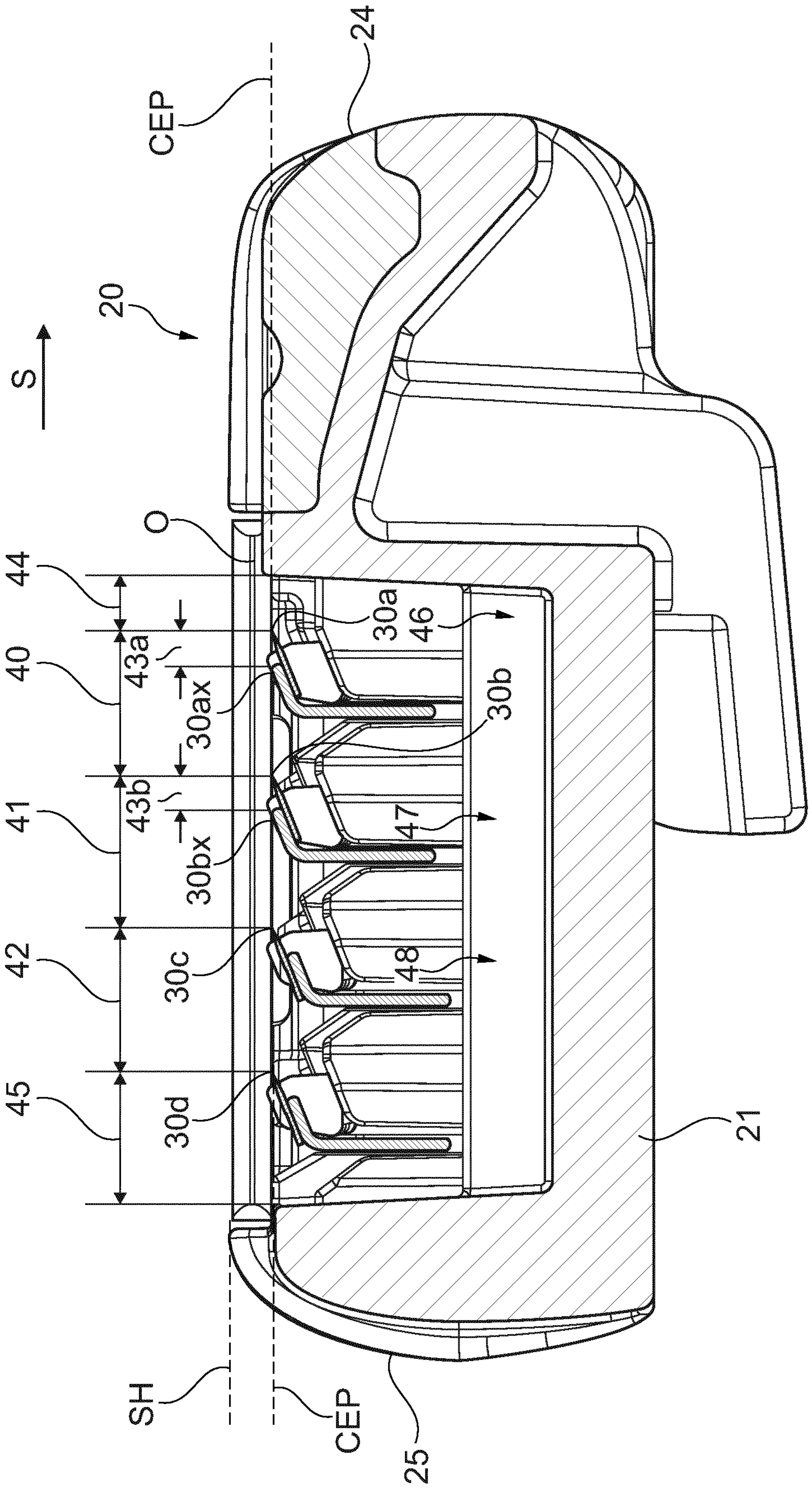
FIG. 8*b* is a duplicate of the schematic cutaway side view of the razor cartridge shown in FIG. 7*a* that has been differently annotated to illustrate the inter-blade spacing.
Figure 9:
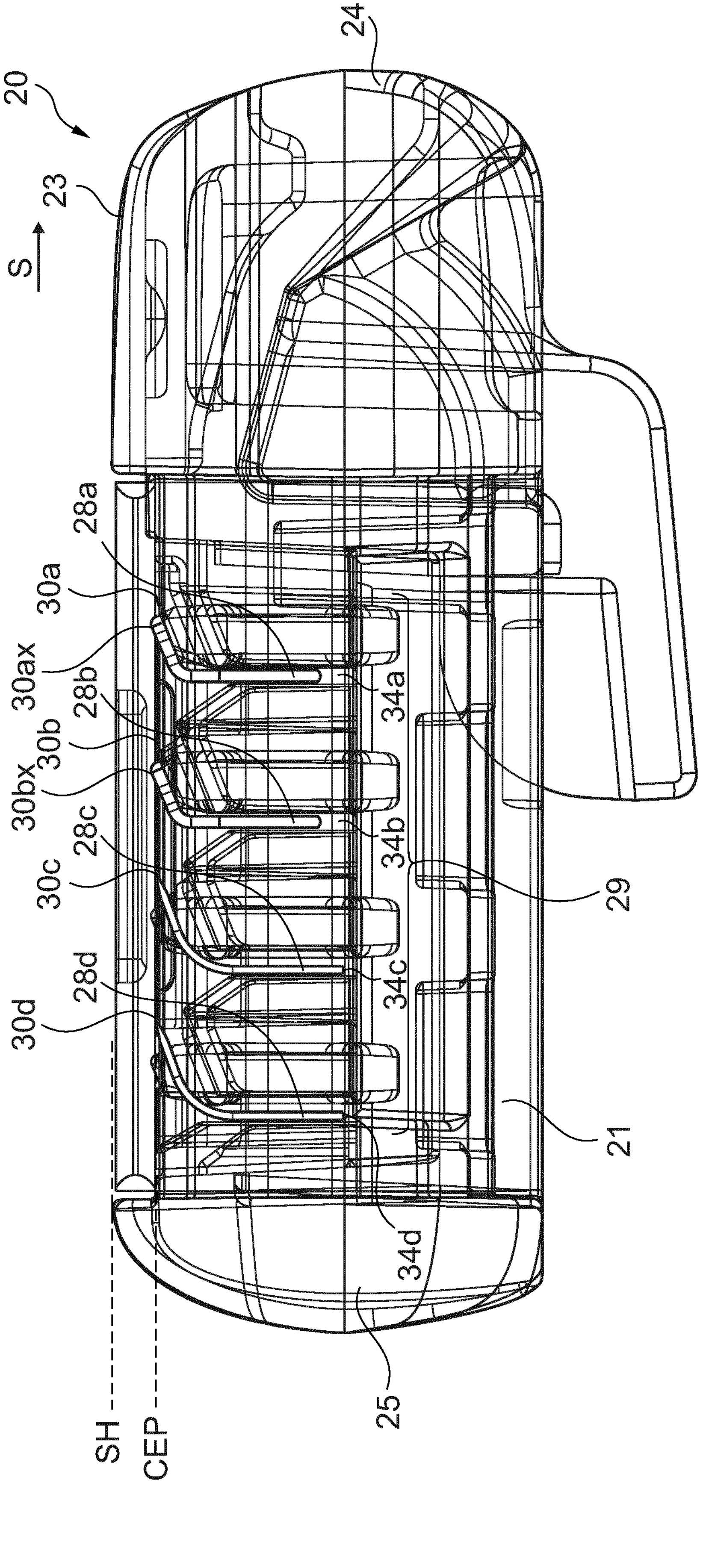
FIG. 9 is a schematic cutaway side view of an alternative embodiment of a razor cartridge comprising at least one integrally formed cutting member.

FIG. 8*b* is a duplicate of the schematic cutaway side view of the razor cartridge 20 shown in FIG. 8*a* that has been annotated to denote inter-blade spacing. The longitudinal line on an internal leading longitudinal wall of the blade receiving section 50 that is closest to a cutting edge plane CEP in use serves as an origin O for the purposes of the present definition.

A leading blade 33*a* to housing 21 span 44 is the transverse span (substantially aligned with the shaving direction S) that is perpendicular to the longitudinal orientation of the blades of the plurality of cutting members 29 that spans the space between the internal leading longitudinal wall of the blade receiving section 50 that is closest to a cutting edge plane CEP in use (the origin) and the cutting edge 30*a* of the leading blade of the plurality of cutting members 29.

A leading inter-blade span 40 that is the closest inter-blade span to the leading longitudinal side 24 of the razor cartridge is a transverse span (substantially aligned with the shaving direction S in use) that is substantially perpendicular to the longitudinal orientation of the blades of the plurality of cutting members 29. The leading inter-blade span 40 begins at an area on cutting edge 30*a* and ends on to a corresponding area on the cutting edge 30*b* of the first intermediate blade 33*b*.

A first intermediate inter-blade span 41 is a transverse span (substantially aligned with the shaving direction S in use) that is substantially perpendicular to the longitudinal orientation of the blades of the plurality of cutting members 29. The first intermediate inter-blade span 41 begins at an area on cutting edge 30*b* and ends on a corresponding area on the cutting edge 30*c* of the second intermediate blade 33*c*.

A trailing inter-blade span 42 is a transverse span (substantially aligned with the shaving direction S in use) that is perpendicular to the longitudinal orientation of the blades of the plurality of cutting members 29. The trailing inter-blade span 42 begins at an area on cutting edge 30*c* and ends on a corresponding area on the cutting edge 30*d* of the blade 33*d* that is closest to the trailing longitudinal side 25 of the razor cartridge 20.

A trailing blade to frame span 45 that is a transverse span (substantially aligned with the shaving direction S in use) that is perpendicular to the longitudinal orientation of the blades of the plurality of cutting members 29 the cutting edge 30*a* and a corresponding area on the internal trailing longitudinal wall of blade receiving section 52.

Thus, the total span of the blade receiving section 31 corresponds to the sum of spans 44, 40, 41, 42, and 45. In practice, the total span of the blade receiving section may be in the range of 7 to 15 mm.

At least one blade mounting portion 70 is disposed on an inner surface 64 of a respective blade support 32 that, in use, faces away from a shaving plane SH. The cutting edge 30 extends forward from the front of the blade support 32. However, the blade support 32 has a non-negligible thickness. For example, the blade support 32 has a thickness in the range 0.12 mm-0.21 mm, and more specifically in the range 0.155 mm-0.185, and most specifically 0.17 mm.

Consequently, a non-negligible span defined as the transverse span (substantially aligned with the shaving direction S in use) that is perpendicular to the longitudinal orientation exists between each cutting edge 30 and the blade-mounting end of each blade support 32 of each cutting member of the plurality of cutting members 29. This may be referred to as a cutting edge to blade span 43 of a respective cutting member. The edge support span may be derived using trigonometry based on the thickness of the blade support 32 and the tilt angle relative to the shaving plane of the blade receiving section 31 of the blade support 32.

In an example, each blade support 32 of the plurality of cutting members 29 is identical and has the same thickness T2 and the same tilt angle A. In this case, the cutting edge to blade span 43*a* or 43*b* are identical.

In an example, one or more of the cutting edge to blade spans 43*a* or 43*b* are in the range 0.3 mm to 0.6 mm, and specifically 0.5 mm.

In an example, at least one blade support 32 of the plurality of cutting members 29 has a different thickness and/or tilt angle to the remainder of the blade supports 32. In this case, at least one cutting edge to blade span 43*a* will differ from the remainder. An effect is that individual cutting edge to blade spans 43*a* or 43*b* may be individually tuned to provide further fine control over skin bulge effects. For example, the cutting edge to blade span 43*a* or 43*b* may be designed to progressively increase or decrease.

A leading blade to frame span 44 is a transverse span (substantially aligned with the shaving direction S in use) that is perpendicular to the longitudinal orientation of the blades of the plurality of cutting members 29. The leading blade to frame span begins at an area on the internal leading longitudinal wall 50 that is, in an example, closest to the cutting edge plane CEP the leading blade to frame span ends at a corresponding area on the cutting edge 30*a* of the blade 33 of the leading cutting member 28*a* that is in an example, closest to the cutting edge plane CEP.

In an example the leading frame to blade span 44 is 0.5 mm to 0.9 mm, and specifically 0.7 mm A trailing blade to frame span 45 is a transverse span (substantially aligned with the shaving direction S in use) that is perpendicular to the longitudinal orientation of the blades of the plurality of cutting members 29. The following blade to frame span begins at an area on the cutting edge 30*d* of the blade 33*d* of the trailing cutting member 28*d*. The trailing blade to frame span 45 ends at a corresponding area on the internal trailing longitudinal wall 52 that is, in an example, closest to the cutting edge plane CEP.

In an example, the trailing frame to blade span 45 is 1.6 mm to 2.0 mm, and specifically 1.8 mm. In an example, the leading blade to frame span 44 is greater than the trailing blade to frame span 45. In an example, the leading blade to frame span 44 is smaller than the trailing blade to frame span 45. In an example, the leading blade to frame span 44 is substantially equal to the trailing blade to frame span 45. In an example, the leading blade to frame span 44 is greater than the leading inter-blade span 40. In an example, the leading blade to frame span 44 is substantially equal to the leading inter-blade span 40. In an example, the leading blade to frame span 44 is smaller than the leading inter-blade span 40. In an example, the trailing blade to frame span 45 is greater than the trailing inter-blade span 42. In an example, the trailing blade to frame span 45 is substantially equal to the trailing inter-blade span 42. In an example, the trailing blade to frame span 45 is smaller than the trailing inter-blade span 42. In an example, the first intermediate inter-blade span 41 and the second intermediate inter-blade span 42 are each substantially equal to the leading inter-blade span 40. In an example, the first intermediate inter-blade span 41 and the second intermediate inter-blade span are each substantially equal to the trailing inter-blade span 42. In an example, the first intermediate inter-blade span 41 is less than the leading inter-blade span 41 and greater than the second intermediate inter-blade span.

In an example, the second intermediate inter-blade span is equal to the trailing inter-blade span 42. In an example, a leading inter-blade span that is closest to the leading longitudinal side of the razor cartridge is greater than a trailing inter-blade span that is closest to the trailing longitudinal side of the razor cartridge.

Specific measurements of the separation distance ranges inter-blade spans will now be discussed. A skilled person will appreciate that many choices and combinations of inter-blade spans may be used.

In an example, the leading inter blade span 40 is within a range of 1.6 mm to 2.2 mm, 1.70 mm to 2 mm, or 1.75 mm to 1.95 mm. When three cutting members 28*a-c* are present, the leading inter blade spans defined above may still apply, in combination with a trailing inter-blade span 42 in a range of 1.6 mm to 2.2 mm, 1.70 mm to 2.00 mm, or within 1.75 mm to 1.95 mm. When four cutting members 28*a-d* are present, the trailing inter-blade span 42 is in a range of 1.6 mm to 2.2 mm, 1.70 mm to 2.00 mm, or within 1.75 mm to 1.95 mm. In an example, the leading inter blade span 40 is within a range of 1.7 mm to 2.2 mm, 1.8 mm to 2.0 mm, or is 1.85 mm. In an example, the first intermediate inter blade span 41 is within a range of 1.55 mm to 1.95 mm, 1.60 mm to 1.80 mm, or is 1.70 mm. In an example, the trailing inter-blade span 42 is within a range of 1.4 mm to 1.8 mm, more specifically 1.50 mm to 1.65 mm, or specifically is 1.55 mm. In an example, the leading blade to frame span 44 is within a range of 0.4-1.0 mm, 0.5 mm to 0.8 mm, or is 0.7 mm. In an example, the trailing blade to frame span 45 is within a range of 1.7 mm to 2.2 mm, 1.8 mm to 2.0 mm, or is 1.85 mm.

However, any possibly combination of inter-blade spans is possible, provided a leading inter-blade span that is closest to the leading longitudinal side 24 of the razor cartridge is greater than a trailing inter-blade span that is closest to the trailing longitudinal side 25 of the razor cartridge.

The ranges discussed above are generally increased as compared to conventional razor cartridges. The rinsability of a cartridge as discussed herein is generally improved, because more space is available between the cutting members 28*a-d* for debris to flow off closer to the leading edge of the razor cartridge 20. The size of skin bulges is also reduced, resulting in an improved shaving performance.

According to an embodiment in which the leading inter blade span 40 is larger compared to the first intermediate inter blade span 41 or the trailing inter-blade span 42, the first two blades that cut the highest amount of hair are far enough apart to ensure that the debris can be removed easily. The remainder of the blades may have a narrower IBS to reduce the risk of nicks and cuts.

In examples, the leading inter-blade span is in the range 1.70 mm to 2.20 mm, more specifically from 1.80 mm to 2.00 mm, and most specifically 1.85 mm. In examples, the trailing inter-blade span is in the range 0.9 mm to 1.6 mm, more specifically from 1.0 mm to 1.5 mm, and most specifically 1.05 or 1.30 mm.

FIG. 8*b* also illustrates a first debris run-off portion 46, a second debris run-off portion 47, and a third debris run-off portion 48. The width of the debris run-off portions is defined by the relative spacing of the cutting members of the plurality of cutting members 29. As illustrated, the first debris run-off portion 46 is wider than the second debris run-off portion 47, which in turn is wider than the third debris run-off portion 48. An effect of this is that, in use, a greater amount of hair clippings and foam can be removed via the first (relatively wider) debris run-off portion 46. This reduces the risk of blockage of the debris run-off portions, particularly when the razor cartridge is used by infrequent shaver users, because the most troublesome debris can escape via the first (relatively wider) debris run-off portion 46.

Design of the size of the leading blade to frame span 44 and/or the trailing blade to frame span 45 is an example. The leading blade to frame span 44 may be larger than, equal to, or smaller than the leading inter-blade span 40. The trailing blade to frame span 45 may be larger than, equal to, or smaller than the trailing inter-blade span 42.

The leading inter-blade span 40 is greater than the trailing inter-blade span 42.

In an example, the first intermediate inter-blade span 41 is equal to, or less than, the leading inter-blade span 40. In an example, the first intermediate inter-blade span 41 is equal to, or greater than, the trailing inter-blade span 42.

A skilled person will appreciate that any disclosed arrangement of inter-blade spans may be combined with any permutation of the blade arrangements (facing towards the shaving plane, or facing away from the shaving plane) illustrated in FIG. 5.

Although a razor cartridge with four blades 33*a-d* has been illustrated, the present specification also includes a razor cartridge comprising three blades, or greater than four blades.

For example, five substantially parallel cutting members 28 may be disposed in a shaving direction of the razor cartridge 20, wherein a second intermediate inter-blade span is defined adjacent to the trailing inter-blade span 42.

In an example, consecutive inter-blade spans of the razor cartridge successively decrease between the leading longitudinal side 24 and the trailing longitudinal side 25 of the razor cartridge in the shaving direction.

Figure 10:
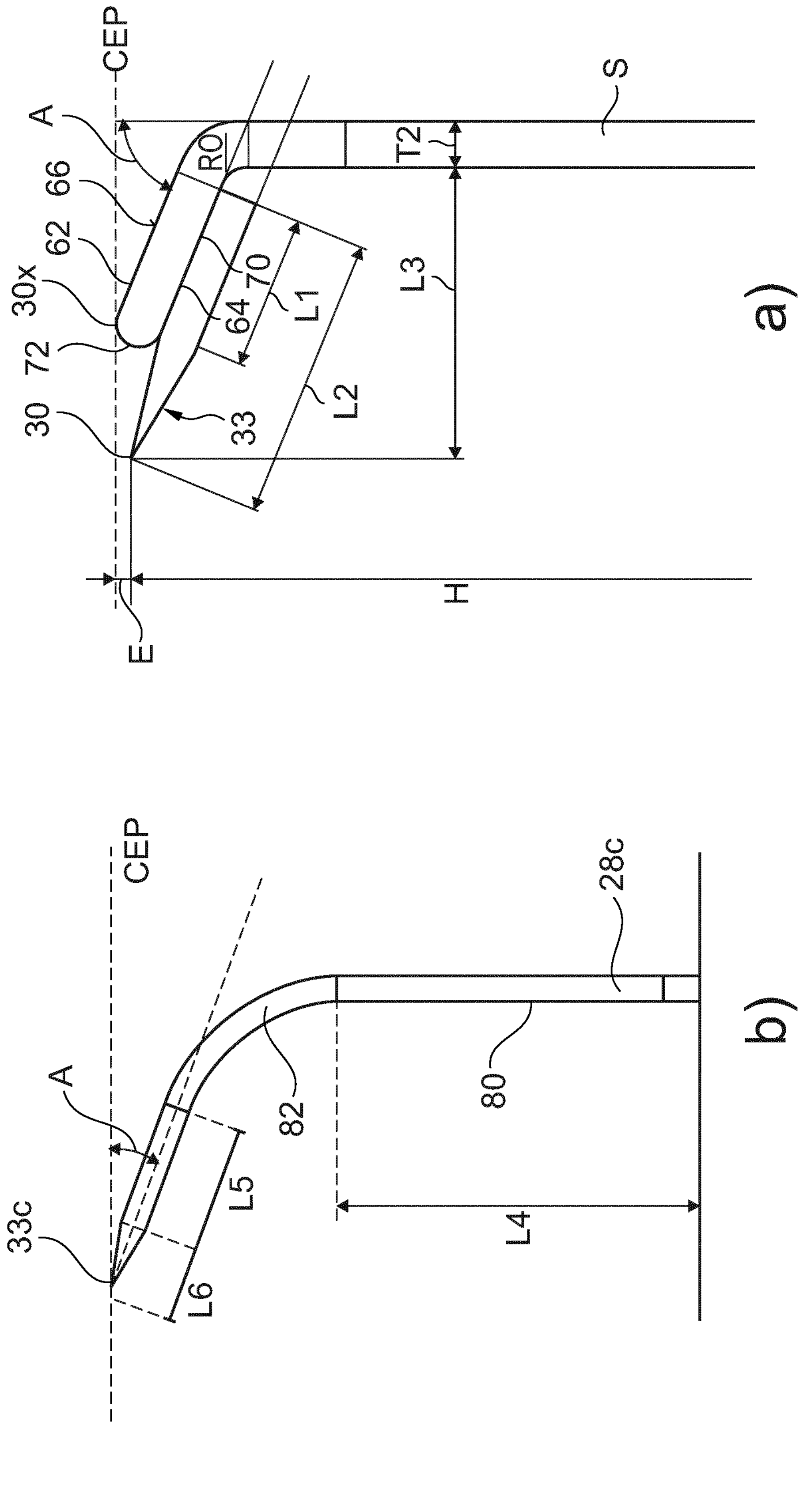
FIG. 10*a* is a schematic side view of a cutting member comprising a blade mounting portion disposed on an inner surface of the respective blade support that, in use, faces away from a shaving plane.
FIG. 10*b* is a schematic side view of an integrally formed cutting member.
Figure 11:
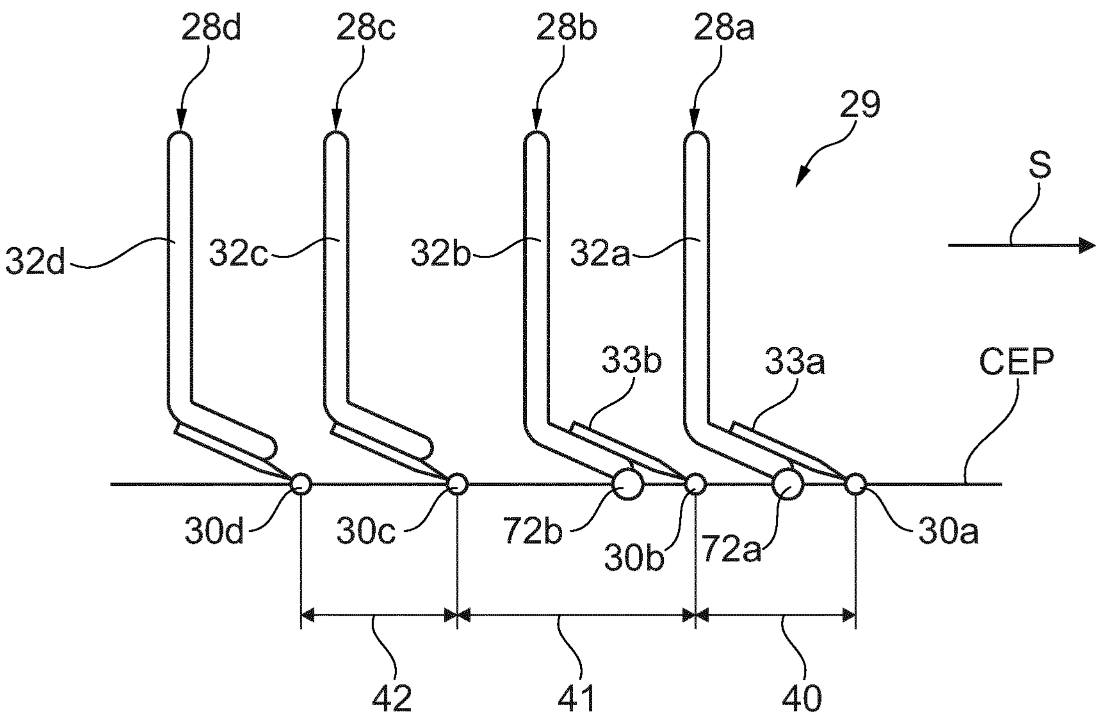
FIG. 11 illustrates a further side view of a blade arrangement illustrating the benefit of enabling at least one of the blade support members to contact the skin.

Turning briefly to FIG. 10, the shaving angle A defines the angle of declination of the inner surface of the blade support 64 from the reference of the blade support 32. In an example, A is an acute angle, in an example is between 60 and 75 degrees, more specifically is 68 degrees.

The longitudinal blade 33 comprises a cutting edge 30 capable of cutting hairs. In an example, a rounded indent is cut from the sheet metal forming the blade support 32.

A conventional blade support (not illustrated) provides a blade mounted on the outer surface of the blade support, such that in use, no part of the blade support comes into contact with cutting edge plane CEP.

Notably, in the present aspects and embodiments, at least one cutting member 28 of the plurality of cutting members 29 comprises a blade mounting portion 70 of the blade support 32 disposed on an inner surface of the respective blade support 28 that, in use, faces away from a shaving plane SH, and a blade attached to the blade mounting portion 70.

According to the present approach, at least one blade 33 is mounted on an inner surface 64 of the respective blade support and projects from underneath the inner surface defining a cutting edge to blade span 43 between a cutting edge 30 of the blade and the end of the blade support 32 towards the shaving plane SH. In use, as the cutting member 28 contacts the cutting edge plane CEP, both the cutting edge of the blade 30 and the end of the blade support 32 contact the cutting edge plane CEP simultaneously, leading to a reduction in the force exerted on the cutting edge plane CEP exerted by a single cutting edge, for example.

In other words, the position of a blade 33 on a blade support 32 when a cutting member 28*a-d* is mounted in the razor cartridge is defined by the fact that an imaginary tangent provided from the surface of the blade 33 that is directed away from the cutting edge plane CEP does not pass through any area of the blade support 32 that the blade 33 is mounted on.

A further definition of the position of a blade 33 on the blade support is that when a cutting member 28*a-d* is mounted in the razor cartridge, an imaginary tangent provided from the portion of the blade 33 in contact with the blade mounting portion 70 that is directed towards the cutting edge plane CEP in use passes through the blade support 32 that the blade 33 is mounted on.

FIG. 10*a* is a schematic side view of a cutting member 28 comprising a blade mounting portion 70 disposed on an inner surface of a blade support that, in use, faces away from a shaving plane SH.

A longitudinal blade support member (in other words a cutting member 28 without the blade 33 attached) comprises a substantially elongated flat lower portion 56, a substantially elongated flat top side 62, and a radius bend portion 58. The radius bend portion 58 may have an inner radius of curvature RO that is more than 0.1 mm. The radius bend portion 58 may have an inner radius of curvature RO that is less than 0.9 mm. A minimum recommended inner radius of curvature RO of sheet metal should be at least the same as its thickness T. A safety factor of the thickness of the blade support 32 may be applied. By multiplying the safety factor with the thickness of T (around 0.17 mm), the radius of curvature RO may be approximately 0.25 mm, more specifically between 0.16 mm and 0.40 mm, and most specifically between 0.25 mm or 0.28 mm.

As discussed, the blade support 32 may be made from a flat sheet metal part which is formed into a curvilinear section before welding of the blade 33 on the inner surface 64 of the blade support 32. The cutting member 28 thus comprises a blade 33 (razor blade).

The blade 33 has, in its flat portion, a thickness T2 about 0.1 mm (for example, between 0.04 and 0.11 mm). The total length L2 of the blade 33 between the cutting edge 30 of the blade 33 and the opposite back edge of the blade 33 is about 1 mm (for example, between 0.8 mm and 1.3 mm). The portion of the blade 33 that is in contact with the inner surface 64 of a blade support that, in use, faces away from a shaving plane SH has a length L1 that is about 0.49 mm+/−0.1 mm long. In this way, a good retention of the blade on the underside of the blade support 32 (the inner surface of the blade support 32) is ensured.

In an example, the height H of the cutting member 28 is between 2.53 mm and 2.63 mm, specifically 2.58 mm.

In an example, the rounded front end 72 (providing skin contact portion 30*x*) of the blade support is rounded or chamfered to improve glideness properties of the cutting member.

In an example, the blade 33 may be positioned on the inner surface 64 of the blade support 32 to adjust the local exposure E of the cutting edge plane CEP positively or negatively compared to a support plane intersecting the front edge of the blade support 30*x*. The exposure is a measure of how prominently the cutting edge 30 of a blade protrudes above or sinks below the rounded front end 72 of its blade support.

In an example, the blade 33 may be positioned to have an exposure E relative to the support plane of the front edge of the blade support 30*x* in the range −80 um to +80 um, more specifically an exposure of about −75 um, −65 um, −60 um, −55 um, −50 um, −45 um, −40 um, −35 um, −30 um, −25 um, −20 um, −15 um, −10 um, −5 um, 0 um, 5 um, 10 um, 15 um, 20 um, 25 um, 30 um, 35 um, 40 um, 45 um, 50 um, 55 um, 60 um, 65 um, 70 um, or 75 um.

The length L3 of the cutting member 28, between the cutting edge 30 and the outer face of the lower portion of the blade support 32 is about 1.0 mm (for example, between 0.9 mm and 1.6 mm).

For blades positioned above their blade support (such as 33*c*, 33*d*), the preferred exposure range is from −50 to 50 um, measured from the shaving plane SH.

The blade 33 is fixed on the inner surface 64 of the blade support by any known means, such as by laser spot welding. In examples, the blade 33 is fixed on the inner surface 64 of the blade support by a plurality of spot welds (for example, between ten and sixteen spot welds) distributed along the longitudinal dimension of the blade support 32. Each of the spot welds may be performed on the inner face 68 of blade 33. Alternatively, each of the spot welds may be carried out on the outer surface of the blade support 66, or a mixture of the two.

FIG. 10*b* is a schematic side view of an integrally formed cutting member 28*e* having performed at its distal end a blade 33*e*. The integrally formed cutting member 28*e* comprises a base portion 80 having a height L4, a curvilinear portion 82, and a cutting-edge portion 84 that is substantially linear and that forms an acute angle A with the cutting edge plane CEP. The cutting-edge portion 84 may be divided into a section having a parallel portion of length L5, and a portion that narrows towards the cutting edge 33*e* of length L6. The material examples and dimensions discussed in relation to the cutting member illustrated in FIG. 10*a* may also be used to provide the integrally formed cutting member 28*e*.

The curvilinear (bent) portion 82*e* can be provided in any form that enables the cutting-edge portion 84 and the cutting-edge 33*e* to meet the cutting edge plane CEP with an acceptable shaving angle.

Figure 12:
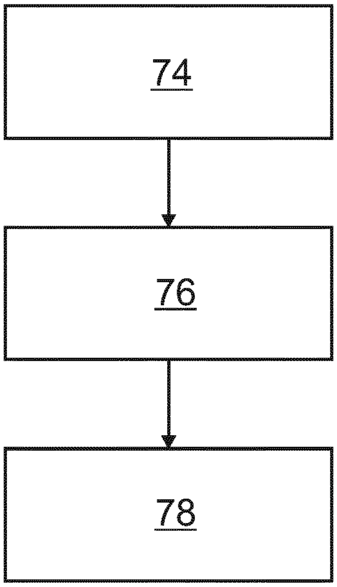
FIG. 12 schematically illustrates a method according to the second aspect.

FIG. 12 schematically illustrates a method of manufacturing a razor cartridge according to a second aspect.

FIG. 1 illustrates a shaving razor assembly 1 according to a third aspect. The shaving razor assembly 1 comprises a razor handle 2 and a razor cartridge 20 according to the first aspect or one of its embodiments, wherein the razor cartridge is either releasably attached to the razor handle via a pivotable 8 or non-pivotable connection, integrally formed with the razor handle via a non-pivotable connection, or integrally formed with the razor handle via a pivotable connection.

According to a fourth aspect, there is provided a kit of parts comprising a razor handle 2 and a razor cartridge holder comprising a plurality of razor cartridges razor cartridge 20 according to the first aspect or its embodiments.

In the preceding specification, numerous specific details are set forth in order to provide a thorough understanding. It will be apparent, however, to one having ordinary skill in the art that the specific detail need not be employed to practice the present disclosure. In other instances, well-known materials or methods have not been described in detail in order to avoid obscuring the present disclosure.

Reference throughout the preceding specification to "one embodiment", "an embodiment", "one example" or "an example", "one aspect" or "an aspect" means that a particular feature, structure or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

REFERENCE NUMERALS

S Shaving direction 28*a-b* cutting member with blade mounted
SH Shaving plane "underneath" of the blade support
CEP Cutting edge plane 28*c-d* cutting member with blade mounted
L Longitudinal direction "on top" of the blade support
IBS inter blade span 28*e-f* integrally-formed cutting member
RO inner radius of curvature 29 plurality of cutting members
T1 Razor blade thickness 30*a-f* cutting edge
T2 Blade support thickness 30*ax* front edge of first blade support
h cutting member height deviation 30*bx* front edge of second blade support
IP extended line 31*a-d* blade receiving section
P-Q transverse cutting member contact 32 blade support axis 33*a-d* blade
34*a-d* holding slots
1 Shaving razor assembly 35 cross member
2 Handle 36 blade support guide
4 proximal portions 38*a-d* resilient finger
5*a*, 5*b* release mechanism 40 leading inter blade span
6 distal portion 41 first intermediate inter blade span
7 thumb rest 42 trailing inter-blade span
8 pivotable bearing member 43*a-d* cutting edge to blade span
9 handle grips 44 leading blade to frame span
12 bulging 45 trailing blade to frame span
14 skin contact area 46 first debris run-off portion
16 first side portion 47 second debris run-off portion
18 second side portion 48 third debris run-off portion
19 cutting member mounting portion 50 internal leading longitudinal wall of
(recess) blade receiving section 31
20 razor cartridge 52 internal trailing longitudinal wall of
21 housing blade receiving section 31
22 platform member 56 lower portion of blade support
23 guard member 58 radius bend portion
24 leading longitudinal side 62 top side of blade support member
25 trailing longitudinal side 64 inner surface of blade support
26 first retainer 66 outer surface of blade support
27 second retainer 68 inner face of blade
70 blade mounting portion
72 rounded front end of blade support 80 base portion
74 obtaining a razor cartridge housing and three or more cutting members . . . 82 curvilinear portion
76 disposing the three or more cutting members . . . 84 cutting edge portion

The invention claimed is:

1. A razor cartridge comprising:

a housing extending longitudinally along a longitudinal axis, wherein the housing comprises a leading longitudinal side, a trailing longitudinal side, and a cutting member mounting portion in-between the leading and trailing longitudinal sides; and a plurality of cutting members disposed at least partially in the cutting member mounting portion, wherein each cutting member of the plurality of cutting members is arranged between the leading longitudinal side and the trailing longitudinal side of the razor cartridge in a shaving direction of the razor cartridge, wherein the plurality of the cutting members comprises a blade support having a blade mounting portion, and a blade attached to the blade mounting portion;

wherein the cutting members comprised in the plurality of cutting members are configured such that, in use, a total number of skin contact areas of the cutting members with a user along a transverse cutting member contact axis is at least one greater than a total number of the cutting members comprised within the plurality of cutting members, wherein the plurality of cutting members comprises a first subset of a first type of cutting member that, in use, has two skin contact areas with the user along the transverse cutting member contact axis, wherein the first type of cutting member comprises a first blade support having a first blade mounting portion disposed on an inner surface of the first blade support that, in use, faces away from a shaving plane and a first blade attached to the first blade mounting portion, wherein the plurality of cutting members comprises a second subset of a second type of cutting member that, in use, has one skin contact area with the user along the transverse cutting member contact axis, wherein the second type of cutting member comprises a second blade support having a second blade mounting portion disposed on an outer surface of the second blade support that, in use, faces towards the shaving plane, and a second blade attached to the second blade mounting portion.

2. The razor cartridge according to claim 1, wherein the skin contact area of each of the plurality of the cutting members comprises a front edge of the blade support, and/or a cutting edge of the blade.

3. The razor cartridge according to claim 2, wherein the front edge is rounded or chamfered.

4. The razor cartridge according to claim 1, wherein the transverse cutting member contact axis of the razor cartridge is defined as an axis that is perpendicular to the longitudinal axis of the razor cartridge, coplanar with a cutting edge plane, and which passes through each cutting member of the plurality of cutting members.

5. The razor cartridge according to claim 1, wherein the first subset of the plurality of cutting members is disposed closer to the leading longitudinal side of the housing than the second subset, and wherein the second subset of the plurality of cutting members is disposed closer to the trailing longitudinal side of the housing compared to the first subset.

6. The razor cartridge according to claim 1, wherein, in use, the number of skin contact areas with the user along the transverse cutting member contact axis provided by the first type of cutting member in the first subset of the plurality of cutting member is twice the number of skin contact area with the user along the transverse cutting member contact axis provided by the second type of cutting member.

7. The razor cartridge according to claim 1, wherein the first blade support of at least one cutting member belonging to the first subset of the plurality of cutting members further comprises:

a base portion for attaching the first blade support to the razor cartridge;

the first blade mounting portion; and a curvilinear portion intermediate to the base portion and the first blade mounting portion;

wherein the first blade mounting portion is disposed on the inner surface of the first blade support that, in use, faces away from the shaving plane;

wherein a first skin contact area of the two skin contact areas of the cutting member belonging to the first subset of the plurality of cutting members is at least a portion of the first blade support that is defined on an outer surface of the first blade mounting portion that, in use, faces towards the shaving plane.

8. The razor cartridge according to claim 1, wherein a leading inter-blade span between consecutive blades comprised in the first subset of the plurality of cutting members ranges from 1.70 mm to 2.20 mm, and/or wherein a trailing inter-blade span between consecutive blades comprised in the second subset of the plurality of cutting members ranges from 0.9 mm to 1.6 mm, or wherein the leading inter-blade span and the trailing inter-blade span are equal.

9. A shaving razor assembly comprising:

a razor handle;

a razor cartridge according to claim 1, wherein the razor cartridge is either releasably attached to the razor handle via a pivotable or non-pivotable connection, integrally formed with the razor handle via a non-pivotable connection, or integrally formed with the razor handle via a pivotable connection.

10. A kit of parts comprising:

a razor handle; and a razor cartridge holder comprising a plurality of razor cartridges according to claim 1.

11. The razor cartridge according to claim 1, wherein the total number of skin contact areas of the cutting members with the user along the transverse cutting member contact axis is at least one fewer than two times the total number of the cutting members of the plurality of cutting members.

12. A razor cartridge comprising:

a housing extending longitudinally along a longitudinal axis, wherein the housing comprises a leading longitudinal side, a trailing longitudinal side, and a cutting member mounting portion in-between the leading longitudinal side and the trailing longitudinal side; and a plurality of cutting members disposed at least partially in the cutting member mounting portion, wherein each cutting member of the plurality of cutting members is arranged between the leading longitudinal side and the trailing longitudinal side of the housing in a shaving direction of the razor cartridge, wherein each of the plurality of the cutting members comprises a blade support having a blade mounting portion, and a blade attached to the blade mounting portion, wherein the plurality of cutting members comprises a first subset of a first type of cutting member and a second subset of a second type of cutting member, the first subset and the second subset being configured such that, in use, each of the first subset and the second subset have at least one skin contact area for each of the plurality of cutting members, wherein the first subset of the first type of cutting member includes a first blade support with a first blade disposed on a first blade mounting portion that is located on an inner surface of the first blade support, such that a cutting edge of the first blade and an outer surface of the first blade support are configured to contact skin of a user, wherein the second subset of the second type of cutting member includes a second blade support with a second blade disposed on a second blade mounting portion that is located on an outer surface of the second blade support, such that a cutting edge of the second blade is configured to contact the skin of the user.

13. A method of manufacturing a razor cartridge comprising:

obtaining a housing extending longitudinally along a longitudinal axis, wherein the housing comprises a leading longitudinal side, a trailing longitudinal side, and a cutting member mounting portion in-between the leading and trailing longitudinal sides; and disposing a plurality of cutting members at least partially in the cutting member mounting portion to thus provide the plurality of cutting members, wherein each cutting member of the plurality of cutting members is arranged between the leading longitudinal side and the trailing longitudinal side of the housing in a shaving direction of the razor cartridge, and each of the plurality of cutting members comprises a blade support having a blade mounting portion and a blade attached to the blade mounting portion; and wherein the plurality of cutting members comprises a first subset of a first type of cutting member that, in use, has two skin contact areas with a user along a transverse cutting member contact axis, wherein the first type of cutting member comprises a first blade support having a first blade mounting portion disposed on an inner surface of the first blade support that, in use, faces away from a shaving plane and a first blade attached to the first blade mounting portion, wherein the plurality of cutting members comprises a second subset of a second type of cutting member that, in use, has one skin contact area with the user along the transverse cutting member contact axis, wherein the second type of cutting member comprises a second blade support having a second blade mounting portion disposed on an outer surface of the second blade support that, in use, faces towards the shaving plane, and a second blade attached to the second blade mounting portion, wherein the plurality of cutting members is configured such that, in use, a total number of skin contact areas of the plurality of cutting members with the user along the transverse cutting member contact axis is at least one greater than a total number of cutting members comprised within the plurality of cutting members.

14. The method according to claim 13, wherein the plurality of cutting members is configured such that, in use, the total number of skin contact areas of the cutting members with the user along the transverse cutting member contact axis is at least one fewer than two times the total number of the cutting members.

15. The method according to claim 13, wherein a front edge of the blade support of each of the cutting members is rounded or chamfered.

* * * * *